(12) United States Patent
Bartkowiak

(10) Patent No.: US 12,231,538 B2
(45) Date of Patent: Feb. 18, 2025

(54) EXCHANGING CRYPTOGRAPHIC KEY INFORMATION

(71) Applicant: Volkswagen Aktiengesellschaft, Wolfsburg (DE)

(72) Inventor: Nicolai Bartkowiak, Giesen (DE)

(73) Assignee: VOLKSWAGEN AKTIENGESELLSCHAFT, Wolfsburg (DE)

( * ) Notice: Subject to any disclaimer, the term of this patent is extended or adjusted under 35 U.S.C. 154(b) by 61 days.

(21) Appl. No.: 17/319,512

(22) Filed: May 13, 2021

(65) Prior Publication Data

US 2021/0359847 A1    Nov. 18, 2021

(30) Foreign Application Priority Data

May 13, 2020   (DE) ...................... 10 2020 205 993.4

(51) Int. Cl.
*H04L 9/08*   (2006.01)
*H04L 9/00*   (2022.01)

(52) U.S. Cl.
CPC .............. *H04L 9/0825* (2013.01); *H04L 9/50* (2022.05); *H04L 2209/84* (2013.01)

(58) Field of Classification Search
CPC ..... H04L 9/0825; H04L 9/50; H04L 2209/84; H04L 2209/805; H04L 9/3239;
(Continued)

(56) References Cited

U.S. PATENT DOCUMENTS 9,774,578 B1 * 9/2017 Ateniese ............... H04L 9/0643
10,757,084 B1   8/2020 Yu
(Continued)

FOREIGN PATENT DOCUMENTS

CA    2468368 A1   12/2005   ............. H04L 12/16
CN    103532704 A   1/2014   ............... H04L 9/08
(Continued)

OTHER PUBLICATIONS

Extended European Search Report, Application No. 21173002.3, 8 pages, Oct. 1, 2021.
German Office Action, Application No. 102020205993.4, 4 pages, Mar. 12, 2021.
(Continued)

*Primary Examiner* — Taghi T Arani
*Assistant Examiner* — Blake I Narramore
(74) *Attorney, Agent, or Firm* — Slayden Grubert Beard PLLC

(57) ABSTRACT

A computer-implemented method is provided for exchanging cryptographic key information between a device and a central point comprises obtaining a cryptographic secret, wherein the cryptographic secret is known to the central point. The method furthermore comprises obtaining a public key of the central point. The method furthermore comprises generating a cryptographic key pair for the device with a private key of the device and a public key of the device. The method furthermore comprises signing the cryptographic secret with the private key of the device. The method furthermore comprises encrypting the cryptographic secret signed with the private key of the device with the public key of the central point. The method furthermore comprises providing the encrypted and signed cryptographic secret, an address of an electronic mailbox of the device, and the public key of the device for the central point via an electronic mailbox of the central point.

20 Claims, 9 Drawing Sheets

(58) Field of Classification Search
CPC ....... H04L 9/3247; H04L 9/085; H04L 9/321; H04L 63/126
See application file for complete search history.

(56) References Cited

U.S. PATENT DOCUMENTS

| | | | |
|---|---|---|---|
| 2006/0053480 A1 | 3/2006 | Lacasse et al. | 726/2 |
| 2016/0012465 A1* | 1/2016 | Sharp | G06Q 20/321 |
| | | | 705/14.17 |
| 2016/0212159 A1* | 7/2016 | Gupta | G06F 21/54 |
| 2017/0046698 A1* | 2/2017 | Haldenby | G06Q 10/0631 |
| 2017/0048216 A1 | 2/2017 | Chow et al. | 713/171 |
| 2017/0180128 A1* | 6/2017 | Lu | H04L 9/3239 |
| 2017/0206532 A1* | 7/2017 | Choi | G06Q 30/02 |
| 2018/0343238 A1* | 11/2018 | Tola | H04L 63/0421 |
| 2019/0179806 A1* | 6/2019 | Reinsberg | G06F 16/1834 |
| 2019/0228461 A1* | 7/2019 | Domokos | G06Q 30/0201 |
| 2019/0253238 A1* | 8/2019 | Schnabel | H04L 9/0637 |
| 2019/0319808 A1* | 10/2019 | Fallah | H04L 9/3297 |
| 2019/0356481 A1* | 11/2019 | Spector | G06Q 20/3829 |
| 2020/0110897 A1* | 4/2020 | Wainblat | H04L 9/085 |
| 2020/0160947 A1* | 5/2020 | Rasovsky | G06F 21/602 |
| 2021/0089676 A1* | 3/2021 | Ford | H04L 9/0825 |
| 2022/0138748 A1* | 5/2022 | Millar | G06Q 40/04 |
| | | | 705/75 |

FOREIGN PATENT DOCUMENTS

| | | | |
|---|---|---|---|
| CN | 104200154 A | 12/2014 | G06F 21/44 |
| CN | 106302348 A | 1/2017 | H04L 12/58 |
| CN | 109756331 A | 5/2019 | H04L 12/58 |
| CN | 110999255 A | 4/2020 | H04L 29/06 |
| DE | 102018002466 A1 | 9/2019 | H04L 9/30 |
| EP | 17790578 A1 | 3/2019 | G06F 21/31 |
| KR | 20040082768 A | 9/2004 | G06F 15/00 |
| KR | 20080004289 A | 1/2008 | G06F 15/00 |
| WO | 2017/190057 A1 | 11/2017 | G06F 21/31 |
| WO | 2018/160863 A1 | 9/2018 | H04L 9/00 |

OTHER PUBLICATIONS

Chinese Office Action, Application No. 202110516196.X, 17 pages, Feb. 21, 2024.
Chinese Office Action, Application No. 202110516196.X, 10 pages, May 21, 2024.

* cited by examiner

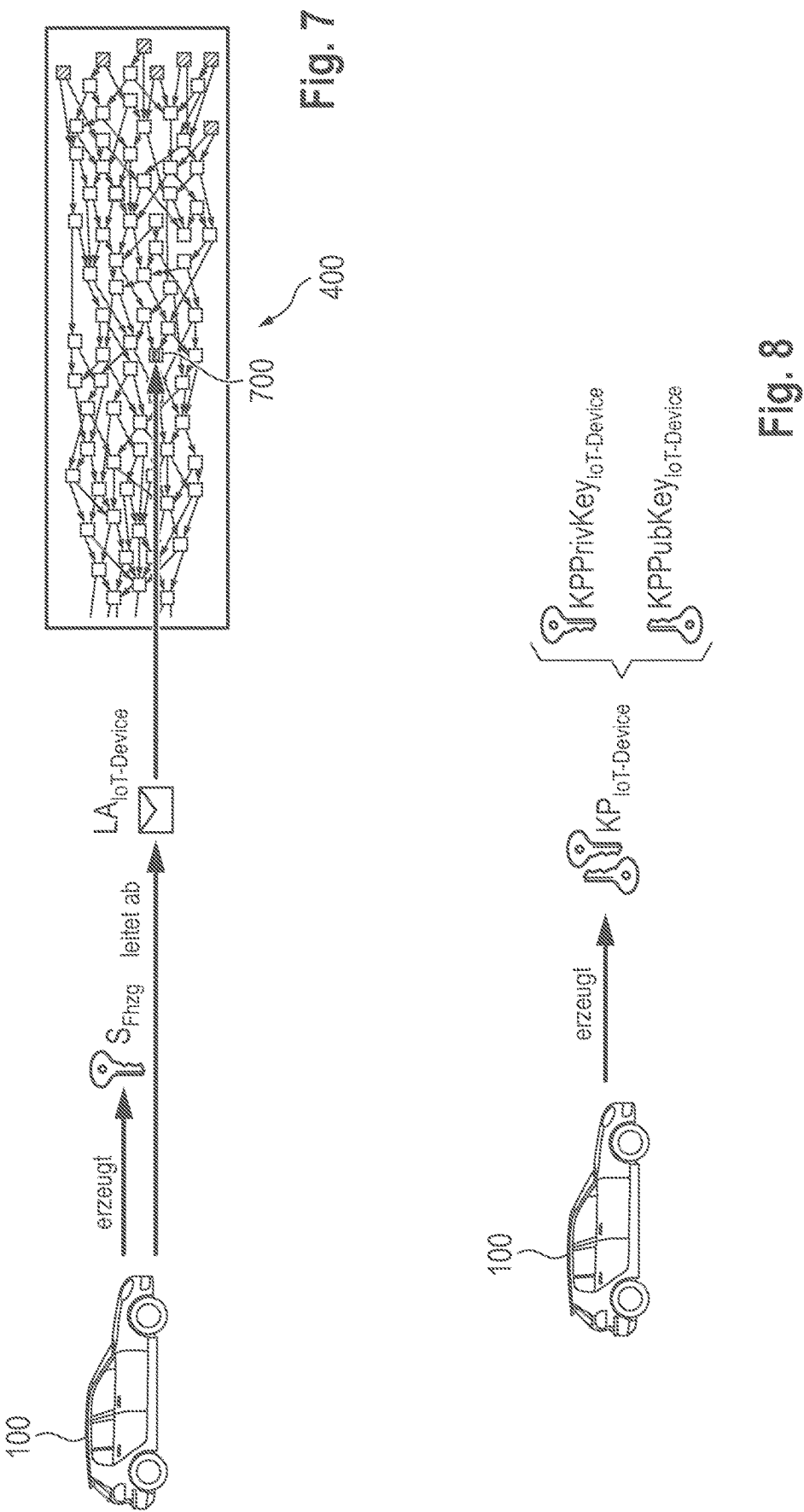

EXCHANGING CRYPTOGRAPHIC KEY INFORMATION

CROSS-REFERENCE TO RELATED APPLICATIONS

This application claims priority to German Patent Application No. DE 10 2020 205 993.4, filed on May 13, 2020 with the German Patent and Trademark Office. The contents of the aforesaid Patent Application are incorporated herein for all purposes.

TECHNICAL FIELD

The present invention relates to methods, devices, and computer programs for exchanging cryptographic key information.

BACKGROUND

This background section is provided for the purpose of generally describing the context of the disclosure. Work of the presently named inventor(s), to the extent the work is described in this background section, as well as aspects of the description that may not otherwise qualify as prior art at the time of filing, are neither expressly nor impliedly admitted as prior art against the present disclosure.

Asymmetric cryptography is a procedure, favored in the field of cryptography, for encrypting data to be sent to a recipient without agreeing in advance on a secret key which must be exchanged between the communication partners in a way that is secure from interception and manipulation. With this method, each participant generates a key pair consisting of a private and a public key.

As the name already suggests, the public key is not secret, but can be distributed publicly (for this purpose, public key servers exist, for example, through which anyone can make their own public key accessible to the general public).

If a sender would now like to transmit encrypted information to a recipient, he asks this person for their public key (or finds it on one of the public key servers described above), which can be used to encrypt a message to them (and only to them).

What is special about asymmetric cryptography is that this message that has been encrypted with the public key can only be decrypted with the associated private key. For this reason, the private key of such a key pair should be kept strictly confidential.

In contrast, in symmetric cryptography, the encryption and decryption of a message takes place with the same key such that, in this type of encrypted communication, such a key must be exchanged in advance through a secure channel (for example a personal meeting), which at the same time describes the benefit of asymmetric cryptography since, due to the public nature of the public key, no such secured exchange must take place here. If two people want to communicate with each other in an encrypted manner, both simply have to know the other person's public key, which is typically not difficult.

Another functionality of asymmetric cryptography is signing messages. If the sender of a message would like to digitally sign it in order to prove that it actually comes from him, he can sign it with his private key. The recipient can then use the sender's public key to check the signature of the message—thereby ensuring its authenticity. Since the private key is confidential, the recipient can be relatively sure that the message actually originates from the expected person.

In the future, more and more units (known as "IoT devices," units of the Internet of Things) that are connected to a network (such as the Internet) will provide data—such as, for example, in process networks (such as those in the context of supply chains). One challenge of this can be ensuring that the data obtained actually originate from the expected unit and not from a sender pretending to be the unit from which the data ostensibly appear to be.

In some systems, this is possible by using certified signatures. However, if the IoT unit is intended to be able, on the one hand, to act as independently/autonomously as possible and, on the other hand, especially to establish and operate communication relationships that can no longer be compromised or read even by the manufacturer of the unit (for example by the institution that equipped the unit with key material), a secure key exchange must be provided. In such scenarios, if only a few units are involved, a key exchange between two participants can be performed in a conventional, direct way: the two communication parties exchange their keys directly in a way that is secure from falsification and interception (such as, for example, a personal and private meeting). If, however, many devices (or also "process instances") are active as data suppliers in the use scenario in question and if they are no longer individually known or reachable, this procedure quickly becomes impracticable. In particular for scenarios in which the number of recipients of such information, or more generally: communication partners, is also high, a communication network with many 1:1 communication paths, and possibly additionally communication groups, quickly results, such that a key exchange between all involved parties in a direct and secure way quickly becomes impracticable.

An application of such a key exchange is the communication between vehicles and other traffic participants, or the communication between the vehicle and vehicle manufacturer. If the data from networked vehicles or also other traffic participants (such as, for example, traffic infrastructure) are to be given unrestricted trust in the future, there should be a possibility of securely exchanging key material between the traffic participants which not only secures the transmission path through common mechanisms but also ensures that the sender is actually the unit or the person that it says it is. This can enable consumers of the data to securely identify its origin.

SUMMARY

There is the need to provide an improved concept for a key exchange between various parties, such as for example between traffic participants.

Exemplary embodiments of the present disclosure take this need into account.

BRIEF DESCRIPTION OF THE DRAWINGS

In the FIGS.:

FIG. 7 shows a schematic diagram of generating an address of an electronic mailbox;

FIG. 8 shows a schematic diagram of the vehicle generating a key pair;

DESCRIPTION

Figure 1A:
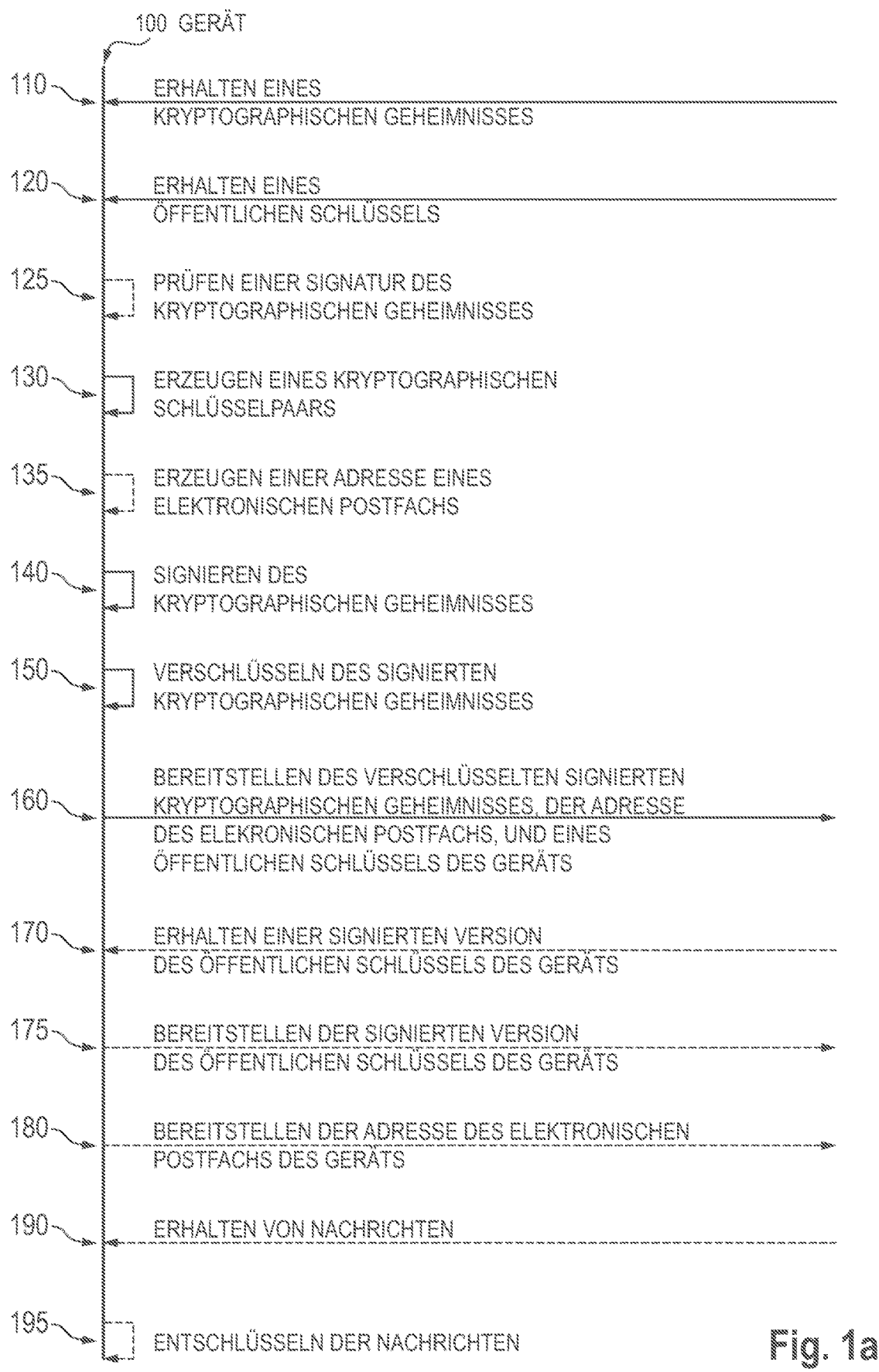
FIG. 1a shows a flow chart of an exemplary embodiment of a method for exchanging cryptographic key information between a device and a central point from the device side.

The details of one or more embodiments are set forth in the accompanying drawings and the description below. Other features will be apparent from the description, drawings, and from the claims.

In the following description of embodiments of the invention, specific details are described in order to provide a thorough understanding of the invention. However, it will be apparent to one of ordinary skill in the art that the invention may be practiced without these specific details. In other instances, well-known features have not been described in detail to avoid unnecessarily complicating the instant description.

Exemplary embodiments of the present disclosure are based on the recognition that a key exchange may be secured in that a shared secret signed by a central point is saved on a device to be newly initialized. The shared secret may be checked using the signature, and then signed by the device and encrypted with a public key of the central device and delivered to the central point. As a result, the central point may receive proof that this is the "right" device. With the signed and encrypted shared secret, an address of an electronic mailbox of the device on the one hand and a public key of the device on the other hand may now be transmitted to the central point. This may then sign the public key of the device and provide it to be called up. Furthermore, the address of the electronic mailbox may be made accessible to other communication partners. A key exchange for newly initialized (Internet of Things) devices is established that is secured in all areas.

In some embodiments, for example solutions on the basis of distributed networks, such as in particular distributed ledge technology (DLT), are suitable for such scenarios, since the distributed data storage reduces the ability to be manipulated (makes it practically impossible), increases the transparency for all participants and thus works without trustworthy intermediaries (known as "trust authorities"), which is beneficial since such trust authorities have to be trusted not only in terms of their integrity, but also in terms of the fact that they protect their own information technology systems well enough that third parties cannot do damage. Some embodiments therefore take benefit of the use of distributed ledger technology; however, the basic concept may also provide a security benefit without using such networks.

Exemplary embodiments disclosure establish a (first) computer-implemented method for exchanging cryptographic key information between a device and a central point. The method is executed by the device. The method comprises obtaining a cryptographic secret. The cryptographic secret is known to the central point. The method comprises obtaining a public key of the central point, for instance from an electronic mailbox of the central point. The method comprises generating a cryptographic key pair for the device with a private key of the device and a public key of the device. The method furthermore comprises signing the cryptographic secret with the private key of the device. The method comprises encrypting the cryptographic secret signed with the private key of the device with the public key of the central point. The method comprises providing the encrypted and signed cryptographic secret, an address of an electronic mailbox of the device, and the public key of the device for the central point via an electronic mailbox of the central point. In this way, the device may make itself known to the central point in a secured manner.

For example, obtaining the public key of the central point may comprise obtaining an address of the electronic mailbox of the central point and calling up the public key of the central point from the electronic mailbox of the central point. In this way, the current valid public key of the central point may be obtained.

For example, the electronic mailbox of the central point and the electronic mailbox of the device may be accessible through a distributed database. A distributed database may offer greater security since a single point of failure that could be used to thwart the key exchange may be avoided through redundancy. In addition, manipulation may possibly be traced.

For example, the distributed database may be based on a distributed ledger technology. Accordingly, addresses of the electronic mailbox of the central point and of the electronic mailbox of the device may be addresses on the distributed ledger. The distributed ledger technology combines the redundancy of distributed databases with protection against manipulation of individual nodes.

For example, the distributed database may be based on a plurality of nodes. Providing and/or obtaining data via an electronic mailbox through the distributed database may be based on a random selection of one or more nodes of the plurality of nodes for providing and/or obtaining the information. The random selection may prevent sabotage of the data exchange from being enabled by manipulating a few preselected nodes. By using multiple nodes, the redundancy may be increased, and thus also the reliability of the data transmission.

In some embodiments, the cryptographic secret is signed by a private key of the central point. The method may also comprise checking the signature of the cryptographic secret based on the public key of the central point. The authenticity of the signature, and also of the cryptographic secret, may thus be verified.

Checking the signature and/or generating the cryptographic key pair may be performed here at least partially in a trusted execution environment of the device. As a result, checking the signature and/or generating and/or storing the key pair of the device is additionally secured.

For example, checking the signature of the cryptographic secret may comprise checking the signature of the cryptographic secret via a certificate authority (CA). Involving a CA may make manipulating the key exchange even more difficult.

In several embodiments, the method further comprises generating the address of the electronic mailbox of the device based on another cryptographic secret. In other words, the address of the electronic mailbox of the device may be derivable from a cryptographic secret.

The method may furthermore comprise obtaining a version of the public key of the device signed by the central point from the central point. The signature of the central point may attest to the authenticity of the public key of the device to third parties.

For example, the method may further comprise providing the signed version of the public key of the device via the electronic mailbox of the device. Alternatively, the central point itself may save the signed version of the public key of the device in the electronic mailbox. The signed public key of the device may be called up by third parties from the electronic mailbox of the device.

In at least some embodiments, the method may furthermore comprise providing the address of the electronic mailbox of the device to one or more further electronic mailboxes from one or more communication partners of the device. As a result, the electronic mailbox of the device may be made known to the communication partners.

For example, the method may furthermore comprise obtaining one or more messages for the device via the electronic mailbox of the device and decrypting the one or more messages with the private key of the device. In other words, the method may comprise encrypted communication based on the key pair of the device.

Some embodiments also establish a (second) computer-implemented method for exchanging cryptographic key information between a device and a central point. The method is executed by the central point. The method comprises providing a cryptographic secret for the device. The method furthermore comprises providing a public key of the central point for the device, for instance via an electronic mailbox of the central point. The method furthermore comprises obtaining a version of the cryptographic secret encrypted with the public key of the central point and signed with a private key of the device, an address of an electronic mailbox of the device, and a public key of the device from the device. The method furthermore comprises checking the obtained version of the cryptographic secret based on a private key of the central point and based on the cryptographic secret. The method furthermore comprises encrypted communication with the device via the electronic mailbox of the device based on the public key of the device. By transmitting the signed and encrypted version of the cryptographic secret, the identity of the device may be proved to the central point.

In some embodiments, the method may furthermore comprise signing the public key of the device with the private key of the central point, and providing the signed public key for the device. As a result, the public key of the device is confirmed by the central point.

Some embodiments furthermore establish a program with a program code for performing at least one of the methods when the program code is executed on a computer, a processor, a control module or a programmable hardware component.

Some embodiments furthermore establish a computer-implemented apparatus for exchanging cryptographic key information between a device and a central point. The apparatus is suitable for exchanging the cryptographic key information from the device side. The apparatus comprises an interface for communication with the central point. The method furthermore comprises one or more processors designed to carry out the first method. Embodiments furthermore establish the device with the apparatus.

Exemplary embodiments of the present disclosure furthermore establish a computer-implemented apparatus for exchanging cryptographic key information between a device and a central point. The apparatus is suitable for exchanging the cryptographic key information from the central point side. The apparatus comprises an interface for communication with the device. The apparatus furthermore comprises one or more processors designed to carry out the second method. Exemplary embodiments furthermore establish the central point with the apparatus.

Additional embodiments are described in greater detail below with reference to the exemplary embodiments shown in the drawings.

Specific references to components, process steps, and other elements are not intended to be limiting. Further, it is understood that like parts bear the same or similar reference numerals when referring to alternate FIGS. It is further noted that the FIGS. are schematic and provided for guidance to the skilled reader and are not necessarily drawn to scale. Rather, the various drawing scales, aspect ratios, and numbers of components shown in the FIGS. may be purposely distorted to make certain features or relationships easier to understand.

Furthermore, summary reference numbers may be used for components and objects that appear several times in an exemplary embodiment or in a drawing but that are jointly described with regard to one or more features.

If not otherwise defined, all of the terms used herein (including technical and scientific terms) have the same meaning that an average person in the art in the field to which the exemplary embodiments belong would attribute to them. It should further be noted that expressions such as those that are defined in generally used dictionaries should be interpreted as if they had the meaning that is consistent with their meaning in the context of the relevant field and are not to be interpreted in an idealized or excessively formal sense as long as this is not expressly defined herein.

FIG. 1a shows a flow chart of an exemplary embodiment of a (computer-implemented) method for exchanging cryptographic key information between a device 100 and a central point 200 from the device side. In other words, the method is executed by the device, for instance by a processor of the device. The method comprises obtaining 110 a cryptographic secret, wherein the cryptographic secret is known to the central point. The method comprises obtaining 120 a public key of the central point. The method comprises generating 130 a cryptographic key pair for the device with a private key of the device and a public key of the device. The method comprises signing 140 the cryptographic secret with the private key of the device. The method comprises encrypting 150 the cryptographic secret signed with the private key of the device with the public key of the central point. The method also comprises providing 160 the encrypted and signed cryptographic secret, an address of an electronic mailbox of the device, and the public key of the device for the central point via an electronic mailbox of the central point.

Figure 1B:
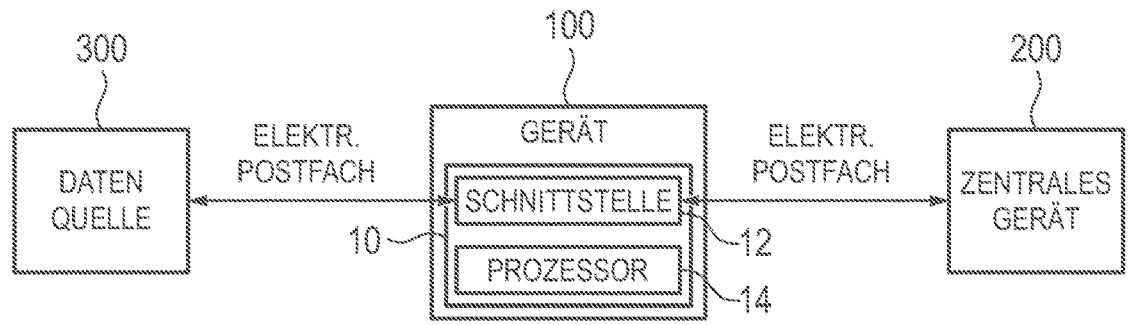
FIG. 1b shows a block diagram of an exemplary embodiment of a device for exchanging cryptographic key information between a device and a central point from the device side.

FIG. 1b shows a block diagram of an exemplary embodiment of an apparatus 10 for exchanging cryptographic key information between a device and a central point from the device side. The apparatus comprises an interface 12 for communicating with the central point (for instance via a distributed database). The apparatus also comprises one or more processors 14, which are coupled to the interface. In general, the functionality of the apparatus is provided by the one or more processors, for instance with the aid of the interface. For example, the one or more processors may be designed to perform internal calculations of the apparatus and coordinate the communication with the central point or other communication partners. The interface may be used to perform the communication. The one or more processors are designed to execute the method from FIG. 1a, for instance in conjunction with the interface. In the following, the apparatus, and in particular the one or more processors of the apparatuses, will be developed by the features of the method. FIG. 1b also shows the device 100 with the apparatus 10.

Several exemplary embodiments of the present disclosure refer to a computer-implemented method, a computer-implemented device, and/or a computer program for exchanging cryptographic key information between the device 100 and the central point 200 from the device 100 side. In principle, the device may be, for example, a device of the Internet of Things, also an IoT device or IoT unit. This includes, in general, devices that (independently) communicate with other devices, i.e. a device of the Internet of Things that may have a device that is "networked," meaning is designed to communicate with one or more other devices. In the following, the device will be described in particular as a vehicle, meaning the device 100 may be a vehicle, for instance a motor vehicle. The same concept may, however, also be applied to components of the vehicle, for instance control devices. In other words, the device may be, for example, a control device for a vehicle. The device is in communication with the central point. The central point here may be, for example, a central server, meaning a server designed to communicate with a plurality of devices. For example, the central point may be a server of a manufacturer or operator/purchaser of the device, for instance of a vehicle manufacturer or an operator of a vehicle fleet.

In principle, the present method is used to enable secure encrypted communication between the device and a counterpart, for instance between the device and other devices (which may act as a data source for the device) or between the device and the central point. In this case, the device may also be seen as a data source for other devices, and other devices may act as the data source for the device. Therefore, a data source as referenced in the present disclosure may also be the device and carry out the method from FIG. 1a accordingly. In this case, the encrypted, signed cryptographic secret is transmitted to the central point to prove to the central point that the device has the cryptographic secret. The public key of the device is then transmitted to the central point to a) have the public key of the device signed by the central point and b) so that the central point may use the public key to encrypt messages to the device.

In principle, the key exchange is based on two components—the key pair of the device and the cryptographic secret.

The method thus comprises obtaining 110 the cryptographic secret. The cryptographic secret is known to the central point. The cryptographic secret is then obtained by the central point, or at least by an intermediary that also provides the cryptographic secret to the central point. In general, the cryptographic secret may be read out from a memory of the device, for instance from a secured memory of the device. For example, the cryptographic secret may be contained in what is known as firmware (hardware programming) of the device. Obtaining the cryptographic secret may comprise reading out the cryptographic secret from the (secured) memory/the firmware. For example, the cryptographic secret may be stored in a secured execution environment (also trusted execution environment) of the device/of the apparatus and be read out from there.

The method furthermore comprises obtaining 120 the public key of the central point, for instance by calling it up from an electronic mailbox of the central point, or also by reading out the public key of the central point from a (secured) memory/firmware of the device. For example, obtaining 120 the public key of the central point may comprise obtaining an address of the electronic mailbox of the central point and calling up the public key of the central point from the electronic mailbox of the central point. For example, the address of the electronic mailbox may be stored in the (secured) memory/firmware of the device, for instance in the trusted execution environment. In another implementation, obtaining the public key of the central point may comprise calling up the public key of the central point from a public key server.

The public key of the central point may be used, for example, for the following operations—to encrypt messages for the central point, and to check the authenticity of the cryptographic secret. For example, the cryptographic secret may be signed by a private key of the central point. In other words, the cryptographic secret may be signed by the central point. The signature of the central point may be verifiable via the public key of the central point. For example, the method may furthermore comprise checking 125 the signature of the cryptographic secret based on the public key of the central point. Additionally or alternatively, the signature of the cryptographic secret may be checked with the aid of a certificate authority (CA). For this purpose, the (secured) memory/firmware of the device may comprise a data structure with addresses with trusted CAs, which may be contacted to check the signature of the cryptographic secret. Checking the signature of the cryptographic secret may comprise checking the signature of the cryptographic secret via a certificate authority, for instance by transmitting the signature to the certificate authority and receiving a result of the verification from the certificate authority. In this case, the communication with the certificate authority may also occur via the interface 12.

The method furthermore comprises generating 130 the cryptographic key pair for the device. In this case, the cryptographic key pair comprises the private key of the device and the public key of the device. The cryptographic key pair is, for example, a key pair for application in asymmetric cryptography. The private key here may be known only to the device (for instance stored in the trusted execution environment), and the public key may be used by other devices/the central point to encrypt messages for the device and/or to check a signature of the device. The public key of the device may be provided in this case (in a version signed by the central point) via an electronic mailbox of the device.

If the cryptographic key pair of the device is generated and, optionally, the signature of the central point of the cryptographic secret is verified, the cryptographic secret may thus be transmitted to the central point. In order to be able to show the central point later that the public key of the device, which has also been transmitted, is also authentic, the cryptographic secret is also signed by the device, with the private key of the device. From the central point side, this signature may be verified with the public key of the device, as a result of which the authenticity of the public key of the device may be proven simultaneously. The method then comprises signing 140 the cryptographic secret with the private key of the device. In asymmetric cryptography, the private key is used to sign messages, and to decrypt messages that have been encrypted based on the public key. The public key is used to check the signature and to encrypt messages for the respective device. In general, a signature is a value based on the one hand on the data to be signed, and on the other hand on the private key. The signature in this case is a result of a cryptographic computing operation regarding the data to be signed (or regarding a hash value of the data to be signed), wherein the cryptographic computing operation is based on the private key. In this case, the signature may be checked on the one hand with the aid of the public key (via a further cryptographic computing operation on the basis of the public key). Simultaneously, the integrity of the signed message may be checked since the signature must match the signed data. In general, the signature does not touch the data to be signed; the signature is usually simply added.

The method furthermore comprises encrypting 150 the cryptographic secret signed with the private key of the device with the public key of the central point, for instance to prevent the cryptographic secret signed with the private key of the device from being intercepted or manipulated by an intermediary. Through encryption, the data to be encrypted, here the cryptographic secret signed with the private key of the device, is converted by a cryptographic computing operation into a format based on the public key of the recipient, such that the encrypted data may only be converted back with the corresponding private key.

The method furthermore comprises providing (for instance transmitting) 160 the encrypted and signed cryptographic secret, the address of the electronic mailbox of the device, and the public key of the device for the central point via the electronic mailbox of the central point. In other words, the data mentioned are transmitted to the central point into the electronic mailbox of the central point. In this case, a part of the data may be provided by reference. For example, the public key of the device may be stored in the electronic mailbox of the device, and the address of the electronic mailbox of the device may be transmitted as a reference to the electronic mailbox of the central point, without the actual public key being transmitted to the electronic mailbox of the central point.

To be able to transmit the electronic address of the device to the mailbox of the central point, the method may furthermore comprise generating 135 the address of the electronic mailbox of the device based on a further cryptographic secret. Alternatively, the address of the electronic mailbox may be generated by another device, for instance by the central point (as a result of which the transmission of the address also becomes unnecessary) or by an administrative entity of the central database.

In at least several exemplary embodiments, the method furthermore comprises obtaining 170 a version of the public key of the device signed by the central point from the central point. In this case, the signature is based, for example, on the private key of the central point. The method may furthermore comprise providing 175 the signed version of the public key of the device via the electronic mailbox of the device, for instance to provide the public key to other devices to check signatures and/or for signed communication with the device. For this purpose, the version of the public key of the device signed by the central point may be transmitted, for example, to the electronic mailbox of the device. Then (or before/at the same time), the address of the electronic mailbox may be made known such that other devices may send the device encrypted data/messages. The method may furthermore comprise providing (for instance transmitting) 180 the address of the electronic mailbox of the device to one or more further electronic mailboxes of one or more communication partners of the device and/or to a central register of addresses of electronic mailboxes.

Based on the public key, the central point and/or one or more further devices may now send encrypted messages to the device. The method may furthermore comprise obtaining (for instance receiving/calling up) 190 one or more messages (encrypted with the public key of the device) for the device via the electronic mailbox of the device. The method may furthermore comprise decrypting 195 the one or more messages with the private key of the device. To communicate with the central point, the device may encrypt the corresponding data/messages with the public key of the respective devices/of the central point. Cryptographic keys of a group communication may also be used for encrypted communication. This is explained in conjunction with FIGS. 3a and/or 3b in more detail, but may also be applied in exactly the same manner to the method/the apparatus from FIGS. 1a and/or 1b.

In the following, the communication is explained by way of example for receiving data from a data source. For example, the method may comprise obtaining a message from a data source via an electronic mailbox (which may be accessible via the decentralized database). The message may comprise data that are encrypted individually for the device by the data source. For example, the message may be obtained via an electronic mailbox of the data source or via an electronic group mailbox. In this case, the method may furthermore comprise obtaining a notification about the message via the electronic mailbox of the device. Alternatively, the message may be obtained directly via the electronic mailbox of the device. The method may furthermore comprise decrypting the data based on a cryptographic key of the device. As also described in conjunction with FIGS. 3a and/or 3b, various types of cryptographic keys may be considered here. For example, the data may be encrypted based on a device-specific public key of the device. In this case, the data may be decrypted based on a device-specific private key of the device. Alternatively or additionally, the data may be encrypted based on a cryptographic key for a group. In this case, the data may be decrypted based on a symmetric key for the group or based on a private key for the group.

As already addressed previously, the communication between the device and the central point and/or other communication partners (such as, for instance, other devices) is based on what are known as electronic mailboxes. Here, the electronic mailboxes may be held, for example, outside of the respective devices/the central point, for instance by a distributed (decentralized) database or by a centralized database. In principle, the mailboxes here may be publicly accessible, such that, for example, each device that has access to the distributed database may write in the respective mailbox and/or read out the respective mailbox. In other words, the electronic mailbox of the central point and the electronic mailbox of the device may be accessible via a distributed database, or alternatively via a centralized database. The distributed database is not under the control of a single entity, but rather is offered distributed through a plurality of (computing) nodes. In other words, the distributed database may be based on a plurality of nodes. Data in the distributed database are replicated between the computing nodes of the plurality of nodes. In this case, data in the distributed database may be added through the nodes, and are then replicated to the other nodes. A possible implementation of such a distributed database is based on distributed ledger technology. In other words, the distributed database may be based on a distributed ledger technology. For this purpose, various distributed ledger technologies are conceivable, such as, for instance, blockchain or a directed acyclic graph. Addresses of the electronic mailbox of the central point and of the electronic mailbox of the device may then be addresses on the distributed ledger.

In this case, the addressed electronic mailboxes may be, for example, data memories provided by the distributed database or the centralized database. These data memories may be addressed by the involved process partners, meaning, for instance, the device and the central point, but also other devices with access to the distributed or centralized database, for example with the possibility of reading out data from the data memory and storing data in the data memory. In order to send another entity a message/data, this message/data may either be stored in the data memory that corresponds to the electronic mailbox of the other entity, or the message/data may be stored in a data memory that corresponds to an electronic mailbox of the sending entity, and additionally a notification may be stored in the data memory that corresponds to the electronic mailbox of the other entity. In this case, the electronic mailboxes are arranged outside the respective devices, in the distributed or centralized database. In the context with the distributed ledger technology, an electronic mailbox is in this case a data memory that is accessible via an address on the distributed ledger and on which data may be stored via the distributed ledger.

The data that are exchanged via the mailboxes are then stored in the distributed ledger. In this case, two approaches may be chosen to increase the reliability. On the one hand, the respective data may each be added to the distributed database at multiple nodes. On the other hand, the nodes may be selected based on a random method. In other words, providing and/or obtaining data via an electronic mailbox through the distributed database may be based on a random selection of one or more nodes of the plurality of nodes for providing and/or obtaining the information. In other words, the device for providing/transmitting data via a mailbox may transmit the corresponding data to (a random selection of) multiple/multiple nodes of the distributed database. To call up/receive data from a mailbox, the device may receive/call up the corresponding data from (a random of) multiple nodes of the distributed database, and then compare the data of the various nodes in order to obtain non-manipulated data.

In general, operations requiring particular security may be executed in the trusted execution environment of the device. For example, checking the signature of the cryptographic secret and/or generating the cryptographic key pair may be performed at least partially in a trusted execution environment of the device. For example, the trusted execution environment may be provided by a processor or a system-on-chip (SoC) of the device, for instance by a processor/SoC 14 of the apparatus 10. But other cryptographic operations may also be executed in the trusted execution environment, such as, for instance, signing and/or encrypting the cryptographic secret.

The interface 12 may for example correspond to one or more inputs and/or one or more outputs for receiving and/or transmitting information, for example in digital bit values, based on a code, within a module, between modules, or between modules of different entities. For example, the interface 12 may be designed to communicate via the distributed database. In this case, the distributed database may be accessed, for instance, via a computer network, for instance via a public computer network such as the Internet, or via a non-public computer network. Accordingly, the interface 12 may be designed to access the distributed database via a computer network. Access to the distributed database may be performed by transmitting and receiving digital data packets, for instance by using provided interfaces through computing nodes by which the distributed database is provided.

In exemplary embodiments, the one or more processors may correspond to any controller or processor or a programmable hardware component. For example, the functionality of the one or more processors may also be realized as software that is programmed for a corresponding hardware component. The one or more processors may therefore be implemented as programmable hardware with correspondingly adapted software. In this context, any processors such as digital signal processors (DSPs) may be used. Exemplary embodiments are not restricted to a specific type of processor in this context. Any processors or also a plurality of processors are conceivable for implementing the one or more processors 14.

More details and aspects of the method and the apparatus from FIGS. 1*a* and/or 1*b* will be mentioned in conjunction with the concept or examples that are described above or below (such as FIGS. 2*a* to 10). The method and the apparatus from FIGS. 1*a* and/or 1*b* may comprise one or more additional optional features which correspond to one or more aspects of the proposed approach or the described examples as described above or below.

Figure 2A:
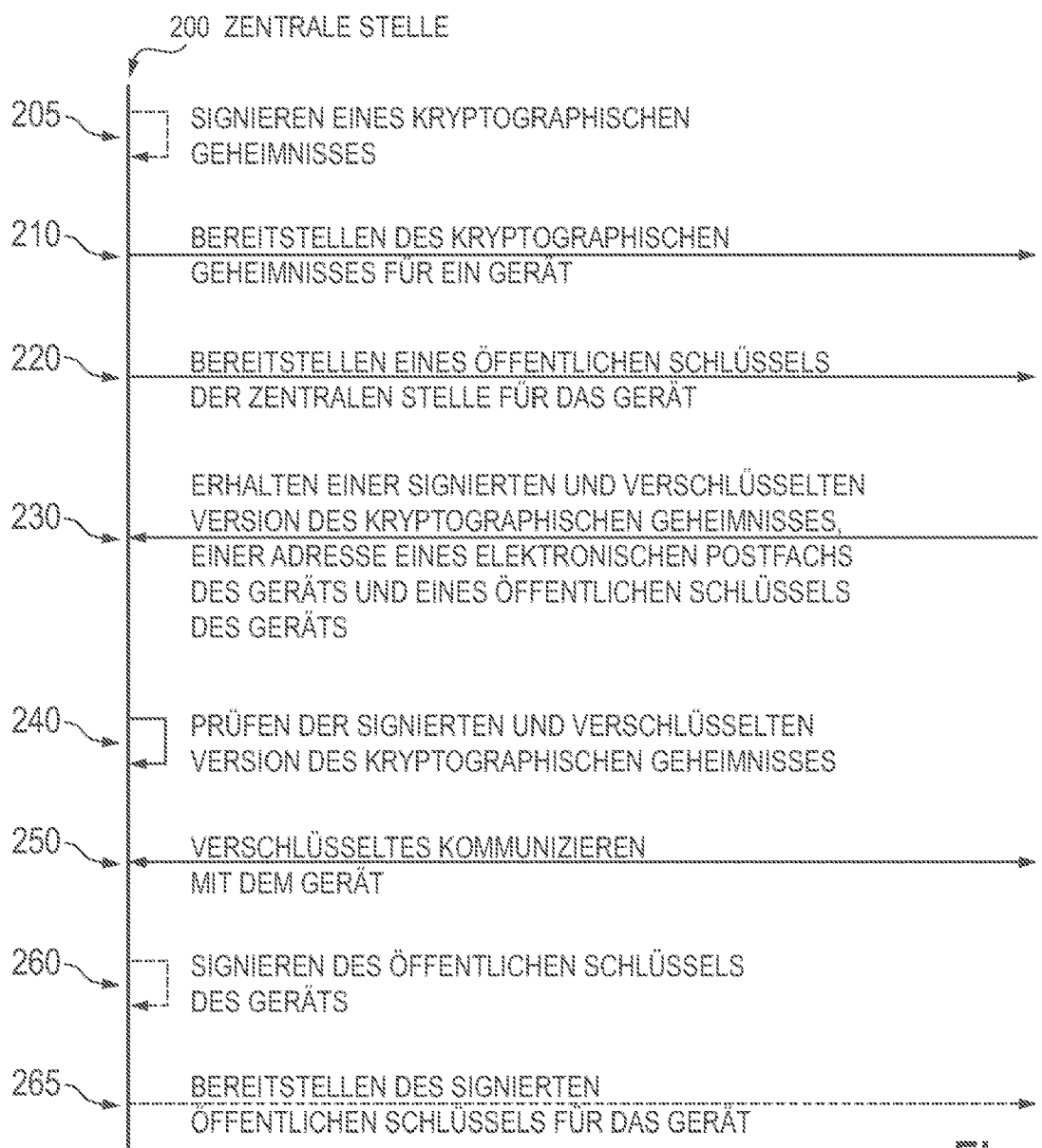
FIG. 2a shows a flow chart of an exemplary embodiment of a method for exchanging cryptographic key information between a device and a central point from the central point side.

FIG. 2*a* shows a flow chart of an exemplary embodiment of a method for exchanging cryptographic key information between a device 100 and a central point 200 from the central point 200 side. In other words, the method from FIG. 2*a* is performed by the central point. The method comprises providing 210 a cryptographic secret for the device. The method comprises providing 220 a public key of the central point for the device. The method comprises obtaining 230 a version of the cryptographic secret encrypted with the public key of the central point and signed with a private key of the device, an address of an electronic mailbox of the device, and a public key of the device from the device. The method comprises checking 240 the obtained version of the cryptographic secret based on a private key of the central point and based on the cryptographic secret. The method comprises encrypted communication 250 with the device via the electronic mailbox of the device based on the public key of the device.

Figure 2B:
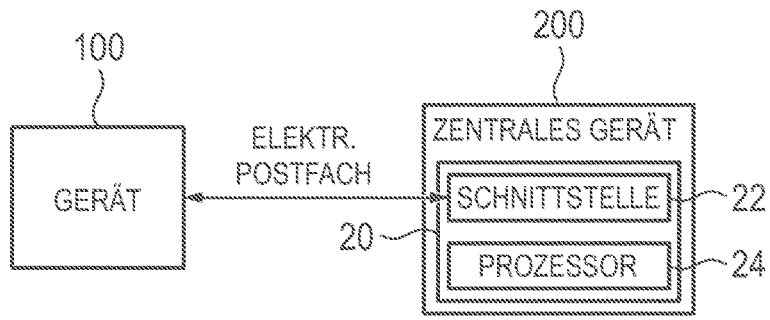
FIG. 2b shows a block diagram of an exemplary embodiment of a device for exchanging cryptographic key information between a device and a central point from the central point side.

FIG. 2*b* shows a block diagram of an exemplary embodiment of a corresponding (computer-implemented) apparatus 20 for exchanging cryptographic key information between a device and a central point from the central point side. In other words, the apparatus 20 is suitable for exchanging the cryptographic key information from the central point side. The apparatus comprises an interface 22 for communicating with the device and/or with one or more further devices, for instance via the distributed database. The apparatus furthermore comprises one or more processors 24, which are coupled with the interface. In general, the functionality of the apparatus is provided by the one or more processors, for instance with the aid of the interface. For example, the one or more processors may be designed to performed internal calculations of the apparatus and coordinate the communication with the device or further communication partners. The interface may be used to perform the communication. The one or more processors are designed to execute the method from FIG. 2*a*, for instance in conjunction with the interface. In the following, the apparatus, and in particular the one or more processors of the apparatuses, will be developed by the features of the method.

While in conjunction with FIGS. 1*a* to 1*b* the exchange of cryptographic key information was described from the perspective of the device, in conjunction with FIGS. 2*a* to 2*b* the perspective of the central point will now be taken. In this case, the central point and the device interact, either temporally staggered (by providing data accommodated in the firmware of the device), or in temporally linked communication, for instance to provide a signed version of the public key of the device.

As has been explained previously, the central point may be, for example, a device, for example a computer, a computer instance, a server, a server instance, or a data processing apparatus, which is configured to communicate with a plurality of devices. In other words, the central point may be responsible, for example, for a plurality of devices, and/or be connected to a plurality of devices via data communication. For example, the central point may be a server of a manufacturer or operator/purchaser of the device, for instance of a vehicle manufacturer or an operator of a vehicle fleet. In exemplary embodiments, this may occur, for example, via the distributed database. In this case, the central point may be designed, for example, to access the distributed database via a computer network, for example the Internet or a non-public computer network.

The method comprises providing 210 the cryptographic secret for the device. For example, providing the cryptographic secret may comprise generating the cryptographic secret, for example based on a cryptographic random function. Providing the cryptographic secret may also comprise signing 205 the cryptographic secret based on a private key of the central point. Thus the central point, like the device, may have a cryptographic key pair with a private key and a public key. The cryptographic secret may be provided to the device, for example, during production. For example, the cryptographic secret may be contained in firmware of the device, or be transmitted through an initial data installation onto a memory of the device. For this purpose, the central point may integrate the (signed) cryptographic secret into the firmware or into the data for the initial data installation.

The method furthermore comprises providing 220 the public key of the central point for the device. In this case, the public key of the central point may also be integrated into the firmware or the data for the initial data installation. Alternatively, the public key of the central point may be provided via a mailbox of the central point. For example, the address of the mailbox of the central point may also be provided to the device, for instance via the firmware or the data for the initial data installation.

The method furthermore comprises obtaining (for instance receiving) 230 the version of the cryptographic secret encrypted with the public key of the central point and signed with the private key of the device, the address of the electronic mailbox of the device, and the public key of the device from the device. In this case, the three mentioned components serve different purposes. In this case, the mentioned data of the central point may be obtained, for example, via the electronic mailbox of the central point. In this case, a part of the data may be provided by reference. For example, the public key of the device may be stored in the electronic mailbox of the device, and the address of the electronic mailbox of the device may be transmitted as a reference to the electronic mailbox of the central point, without the actual public key being transmitted to the electronic mailbox of the central point.

The cryptographic secret is obtained primarily so that it may be verified that the apparatus that provides the mentioned data is also the device. Therefore, the method comprises checking 240 the obtained version of the cryptographic secret based on the private key of the central point and based on the cryptographic secret. In this case, the cryptographic secret is known to the central point and may therefore be compared with the cryptographic value that is provided to the central point by the device.

The public key in turn is used to send the device encrypted messages and to check the authenticity of the signed messages sent by the device. Accordingly, the method comprises encrypted communication 250 with the device via the electronic mailbox of the device based on the public key of the device. In this case, the electronic mailbox of the device may in turn be addressed based on the address of the mailbox of the device. As has already been described in conjunction with FIGS. 1*a* and 1*b*, the electronic mailbox of the central point and the electronic mailbox of the device may be accessible via a distributed database, or alternatively via a centralized database. Furthermore, to provide/transmit data via a mailbox, the central point may transmit the corresponding data to (a random selection of) multiple/multiple nodes of the distributed database.

In order that other devices may also trust the device, the public key of the device may be signed by the central point. In other words, the method may comprise signing 260 the public key of the device with the private key of the central point. The method may furthermore comprise providing 265 the signed public key for the device, for instance via the electronic mailbox of the device.

The interface 22 may for example correspond to one or more inputs and/or one or more outputs for receiving and/or transmitting information, for example in digital bit values, based on a code, within a module, between modules, or between modules of different entities. For example, the interface 22 may be designed to communicate via the distributed database. In this case, the distributed database may be accessed, for instance, via a computer network, for instance via a public computer network such as the Internet, or via a non-public computer network. Accordingly, the interface 22 may be designed to access the distributed database via a computer network. Access to the distributed database may be performed by transmitting and receiving digital data packets, for instance by using provided interfaces through computing nodes by which the distributed database is provided.

In exemplary embodiments, the one or more processors 24 may correspond to any controller or processor or a programmable hardware component. For example, the functionality of the one or more processors may also be realized as software that is programmed for a corresponding hardware component. The one or more processors may therefore be implemented as programmable hardware with correspondingly adapted software. In this context, any processors such as digital signal processors (DSPs) may be used. Exemplary embodiments are not restricted to a specific type of processor in this context. Any processors or also a plurality of processors are conceivable for implementing the one or more processors 24.

More details and aspects of the method and the apparatus from FIGS. 2*a* and/or 2*b* will be mentioned in conjunction with the concept or examples that are described above or below (e.g., FIG. 1a to 1b, 3a to 10). The method and the apparatus from FIGS. 2a and/or 2b can comprise one or more additional optional features which correspond to one or more aspects of the proposed concept or the described examples as described above or below.

Figure 3A:
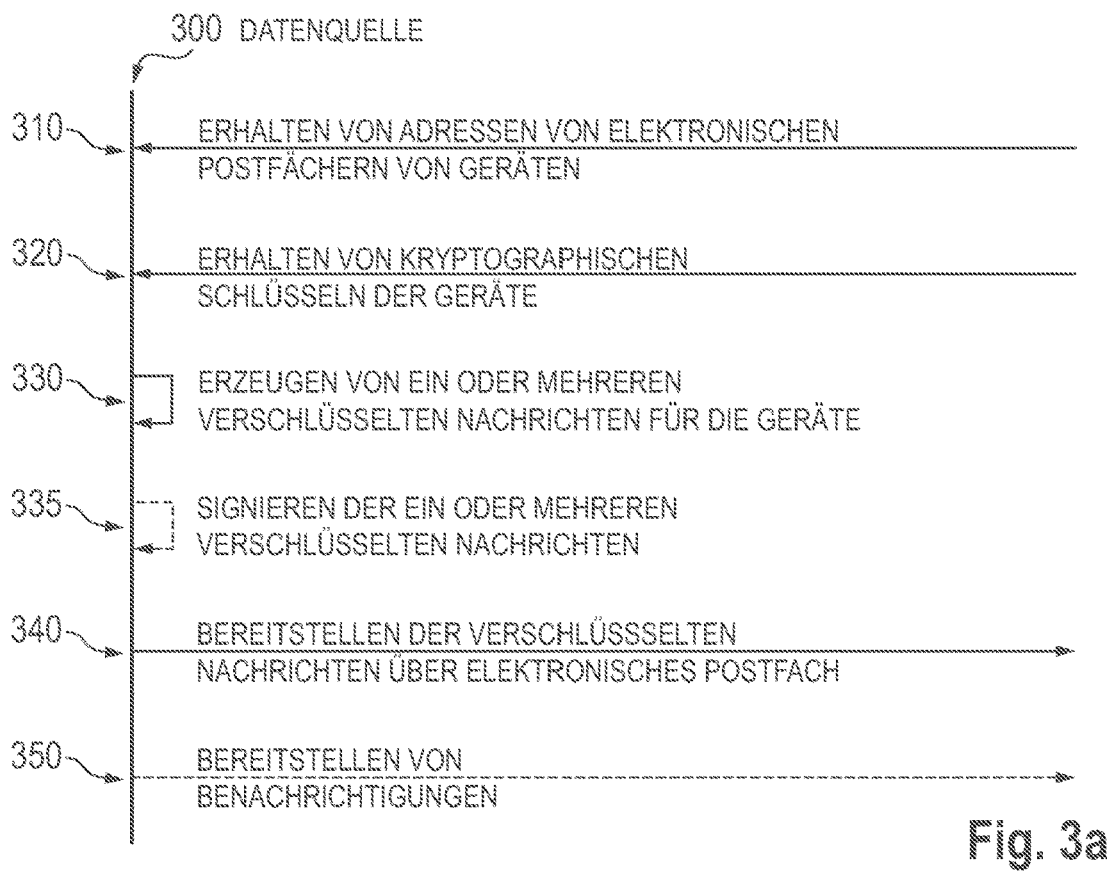
FIG. 3a shows a flow chart of an exemplary embodiment of a method for the encrypted provision of data from a data source for a plurality of devices.

FIG. 3a shows a flow chart of an exemplary embodiment of a computer-implemented method for encrypted provision of data from a data source for a plurality of devices. The method comprises obtaining 310 one or more addresses of one or more electronic mailboxes of the plurality of devices. The method comprises obtaining 320 cryptographic keys of the plurality of devices. The method comprises generating 330 one or more messages for the plurality of devices based on the data. For the devices of the plurality of devices, individually encrypted messages are generated based on the cryptographic keys. The method comprises providing 340 the one or more encrypted messages via at least one electronic mailbox based on the one or more addresses of the one or more electronic mailboxes of the plurality of devices.

Figure 3B:
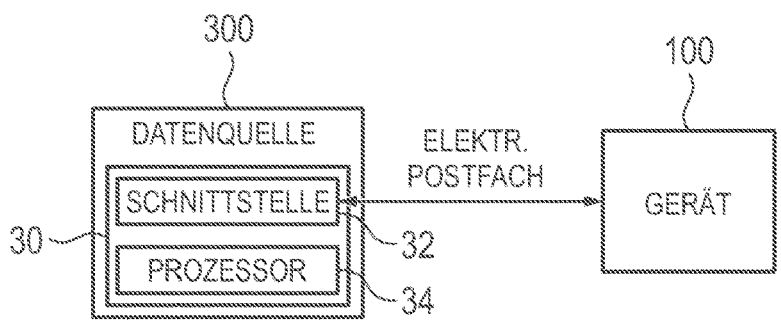
FIG. 3b shows a block diagram of an exemplary embodiment of a device for the encrypted provision of data from a data source for a plurality of devices.

FIG. 3b shows a block diagram of an exemplary embodiment of a corresponding computer-implemented apparatus 30 for encrypted provision of data from a data source 300 for a plurality of devices 100. The apparatus comprises an interface 32 for communicating with the plurality of devices. The method furthermore comprises one or more processors 34, which are coupled with the interface. In general, the functionality of the apparatus is provided by the one or more processors, for instance with the aid of the interface. For example, the one or more processors may be designed to perform internal calculations of the apparatus and coordinate the communication with the plurality of devices. The interface may be used to perform the communication. The one or more processors are designed to execute the method from FIG. 3a, for instance in conjunction with the interface. In the following, the apparatus, and in particular the one or more processors of the apparatuses, will be developed by the features of the method. FIG. 3b also shows the data source 300 with the apparatus 30.

Various exemplary embodiments refer to a computer-implemented method, a computer-implemented apparatus, and a computer program for providing data from a data source for a plurality of devices from the perspective of the data source. In principle, both the data source and the one or more devices may be, for example, devices of the Internet of Things, also known as IoT devices or IoT units. This includes, in general, devices that (independently) communicate with other devices, i.e., a device of the Internet of Things may be characterized as a device that is "networked," meaning is designed to communicate with one or more other devices. In the following, reference will be made for example to vehicles. Therefore, the data source may be, for instance, a vehicle, or one or more of the plurality of devices may be vehicles. In particular, the data source may also be a component of a vehicle, and the plurality of devices can also be (other) vehicle components, such as, for instance, control devices of the vehicle. The data source and the plurality of devices are in communication with each other, for example via a distributed database. In this case, the distributed database may be accessible, for example, via a computer network.

The method comprises obtaining 310 one or more addresses of one or more electronic mailboxes of the plurality of devices. In principle, the plurality of devices can be addressable via two different types of electronic mailboxes. On the one hand, each apparatus can have its own electronic mailbox, meaning a device-specific electronic mailbox can be assigned to each device. On the other hand, the plurality of devices may also communication via what are known as electronic group mailboxes, meaning mailboxes that are used by multiple devices to receive messages. The respective device can either monitor the group mailbox in order to obtain newly received messages, or the device can obtain a notification about the receipt of a message in the electronic group mailbox via its device-specific electronic mailbox. Another possibility is that messages are stored in the electronic mailbox of the data source, and the respective device obtains a notification about the message in its device-specific electronic mailbox. Therefore, the one or more addresses of the one or more electronic mailboxes can comprise addresses of the device-specific electronic mailboxes of the devices and/or addresses of one or more electronic group mailboxes used by the plurality of devices.

The method furthermore comprises obtaining 320 the cryptographic keys of the plurality of devices. Analogously to the mailboxes, a distinction is made here as well between two types of cryptographic keys. For example, the cryptographic keys may comprise one or more device-specific public keys of the plurality of devices. These may be, for example, the respective public keys of an asymmetric key pair of the devices. For example, the cryptographic keys may comprise a device-specific key for each device of the plurality of devices. For example, obtaining the cryptographic keys of the plurality of devices can comprise calling up a (device-specific) public key of the respective device from the electronic mailbox of the device. Alternatively or additionally, the cryptographic keys may comprise one or more cryptographic keys for a group of devices, for instance a cryptographic group key. In this case, the cryptographic group key may be, for instance, a public group key of an asymmetric key pair for the respective group, or the cryptographic group key can be a symmetric group key which is exchanged encrypted between the data source and the plurality of devices (based, for instance, on the asymmetric encryption via the public keys of the devices and of the data source).

In general, the addresses of the devices and/or the cryptographic keys may be obtained in multiple ways. For example, the one or more addresses and/or the cryptographic keys may be read out from a memory of the data source, for instance from firmware of the data source or from a trusted execution environment of the data source. Alternatively or additionally, the one or more addresses and/or the cryptographic keys may be called up by a trusted central point. Alternatively or additionally, the one or more addresses and/or the cryptographic keys may be made known by the respective devices, for instance by notifying the data source via the electronic mailbox of the data source.

The method furthermore comprises generating 330 the one or more messages for the plurality of devices based on the data. For the devices of the plurality of devices, individually encrypted messages are generated based on the cryptographic keys (and based on the data). In this case, the data may be, for example, data that have been generated by the data source. For example, the data source may be a sensor or comprise a sensor, for instance a sensor of a vehicle, and the data may be sensor data from the sensor. Alternatively, the data source can be a control device of a vehicle, and the data may be status information from the control device. The data are encrypted individually for the plurality of devices.

In some embodiments, "encrypted individually" does not necessarily mean that the data are encrypted separately for each device. For example, the data may be provided via the one or more messages such that the accessibility of the data within the respective encrypted message for the plurality of devices is controlled via the encryption of the messages. In some exemplary embodiments, the data may be encrypted for a group of vehicles (meaning, for example, a true subset of the plurality of vehicles) with a group key; for other vehicles the data can be encrypted with the respective device-specific public key. In some exemplary embodiments, however, the data are encrypted individually (for instance separately) for each individual device of the plurality of devices. In addition, there are also multiple possibilities when generating the one or more messages. In one variant, for each vehicle of the plurality of vehicles, its own message (which can be encrypted, for instance, based on the device-specific public key of the vehicle) can be generated. In this case, the contents of the message can be encrypted based completely on a (single) cryptographic key. Such a procedure can also be described as "encryption at the data set level" since the entire data set (contents) of the message is encrypted with the same key. In this case, an individually encrypted message can be generated for each device of the plurality of devices. The individually encrypted message can comprise those data that should be accessible to the respective device. Alternatively, a (single) message may comprise multiple components, wherein the different components can be differently encrypted. In other words, a (single) message may be generated for the plurality of devices. The data can be encrypted within the message individually for the plurality of devices. In other words, the components of the message can be intended for different devices of the plurality of devices, and also differently encrypted accordingly.

In some exemplary embodiments, the one or more messages is or are further signed by the data source, with the private key of the data source. The authenticity of the messages can then be checked by the devices to which the messages are provided based on the public key of the data source. Accordingly, the method can comprise signing 335 the one or more messages.

The method furthermore comprises providing 340 the one or more encrypted messages via at least one electronic mailbox based on the one or more addresses of the one or more electronic mailboxes of the plurality of devices. In doing so, as already presented above, multiple implementations are possible. For example, the one or more messages can be provided via an electronic mailbox of the data source or via an electronic group mailbox. In these cases, the method may furthermore providing notifications 350 about the provision of the one or more messages for the devices via the electronic mailboxes of the devices (based on the addresses of the electronic mailboxes of the devices). In other words, the data source may provide the data in a generally accessible mailbox (of the data source or of the group) and notify the individual devices of this. The respective apparatuses can then pick up the messages from the generally accessible mailbox. Alternatively, the one or more messages can be delivered (directly) via the electronic mailboxes of the devices.

As already addressed previously, the communication between the data source and the plurality of devices is based on what are known as electronic mailboxes. Here, the electronic mailboxes may be held, for example, outside of the data source/of the respective devices, for instance through a distributed (decentralized) database or through a centralized database. In principle, the electronic mailboxes can in this case be publicly accessible such that, for example, each apparatus that has access to the distributed database can write in the respective mailbox and/or read out the respective mailbox. In other words, the electronic mailbox of the data source and the one or more electronic mailboxes of the plurality of devices can be accessible via a distributed database, or alternatively via a centralized database. In this case, the concept of the electronic mailboxes and distributed databases that was presented in conjunction with FIGS. 1a to 2b can draw upon.

The interface 32 may for example correspond to one or more inputs and/or one or more outputs for receiving and/or transmitting information, for example in digital bit values, based on a code, within a module, between modules, or between modules of different entities. For example, the interface 32 may be designed to communicate via the distributed database. In this case, the distributed database may be accessed, for instance, via a computer network, for instance via a public computer network such as the Internet, or via a non-public computer network. Accordingly, the interface 32 may be designed to access the distributed database via a computer network. Access to the distributed database can be performed by transmitting and receiving digital data packets, for instance by using provided interfaces through computing nodes by which the distributed database is provided.

In exemplary embodiments, the one or more processors 34 can correspond to any controller or processor or a programmable hardware component. For example, the functionality of the one or more processors may also be realized as software that is programmed for a corresponding hardware component. The one or more processors may therefore be implemented as programmable hardware with correspondingly adapted software. In this context, any processors such as digital signal processors (DSPs) can be used. Exemplary embodiments are not restricted to a specific type of processor in this context. Any processors or also a plurality of processors are conceivable for implementing the one or more processors 34.

More details and aspects of the method and the apparatus from FIGS. 3a and/or 3b will be mentioned in conjunction with the concept or examples that are described above or below (e.g., FIG. 1a to 2b, 4 to 10). The method and the apparatus from FIGS. 3a and/or 3b can comprise one or more additional optional features which correspond to one or more aspects of the proposed concept or the described examples as described above or below.

Exemplary embodiments refer to the secure key exchange for communication encryption and authenticity verification with IoT devices, for example via distributed ledger networks.

An exemplary functional principle is described using an example from the context of "supply chains" but is useful and applicable for any scenario which has the aforementioned features. In concrete terms, the present example is the outbound logistics process, meaning the shipment of completed vehicles. Numerous partners (such as logistics experts, shipping companies, service providers, banks, insurance companies, etc.) and of course the vehicles rolling freshly off the line participate in this process as process instances.

A participant within this process network would like being able to be sure that the received data originate from the vehicle in question itself and that it is actually a vehicle of the process partner (meaning of the OEM, original equipment manufacturer). Likewise, the manufacturer/OEM would also like being able to be sure that the received data actually originate from their "own" vehicle (acting autonomously with regard to the data delivery) and an attacker has not taken possession of its identity. Finally, the vehicle itself would also like to be sure that it has been equipped with key material by the correct institution (meaning the OEM) and has not, for example, been manipulated by an attacker such that it sends data under a false identity (meaning, for example, that a vehicle of a first manufacturer pretends to be a vehicle of a second manufacturer). In summary, no one (not the manufacturer, nor other participants, nor any attacker) should be allowed to send messages in the name of a data supplier (here: vehicle). The previously mentioned requirements are met by at least several exemplary embodiments of the present disclosure, the implementation of which is described step-by-step by way of example in the following. Here, the vehicle may correspond, for example, to the device 100 from FIG. 1*a* and/or 1*b*, the vehicle manufacturer (for instance a server of the vehicle manufacturer) can correspond to the central point 200 from FIG. 2*a* and/or 2*b*, and the participant in the process network can correspond to a data source 300 from FIG. 3*a* and/or 3*b*.

Figure 4:
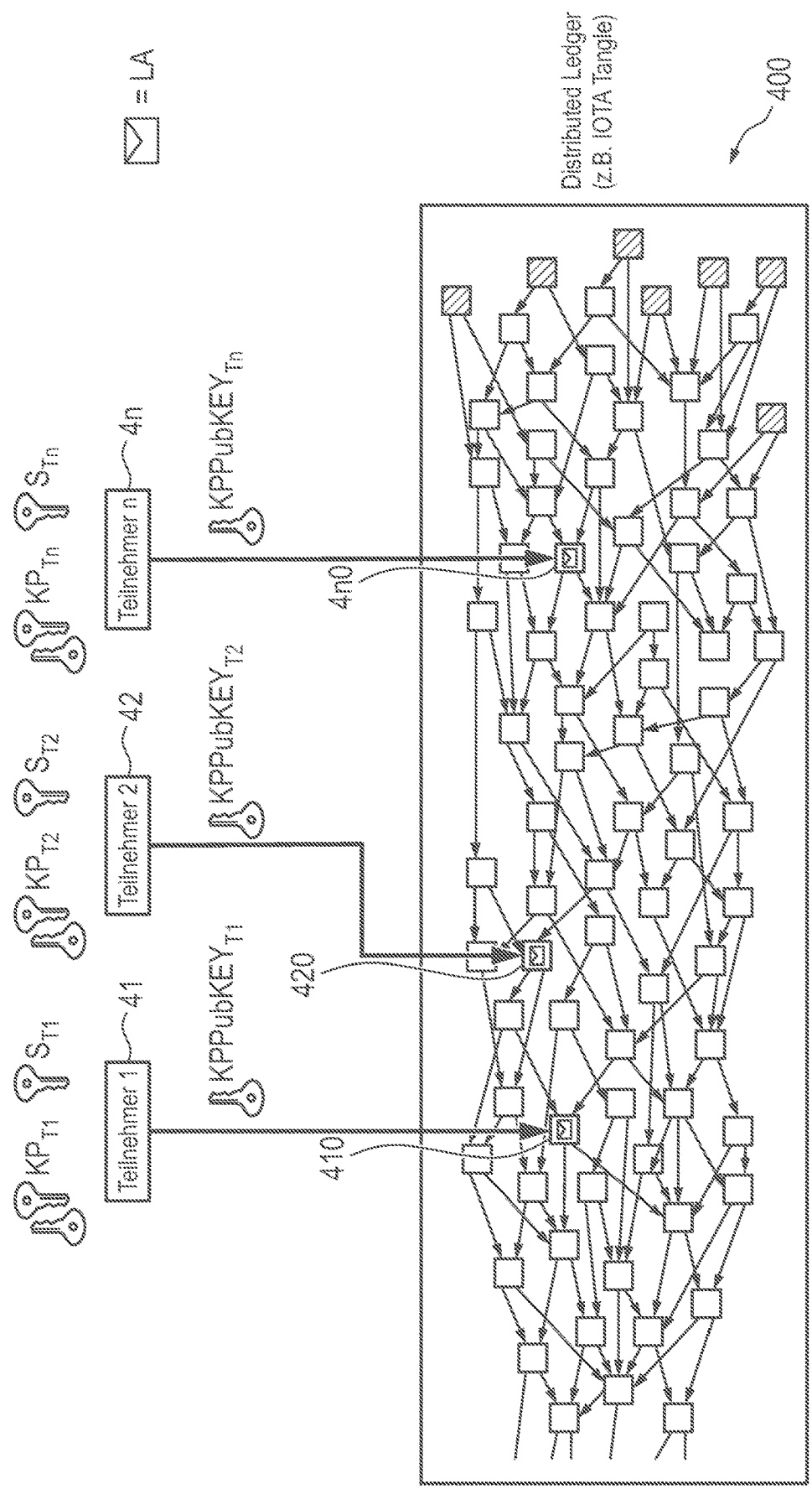
FIG. 4 shows a schematic overview of keys and postbox addresses in the distributed ledger.

Section 1.1: As previously explained, some exemplary embodiments make use of the decentralized nature of distributed ledger networks. FIG. 4 shows a schematic overview of keys and postbox addresses in the distributed ledger 400. Each participant 41; 42; 4*n* of such a network (in the present example a participant in a supply chain process network) can generate a pair of a private and an associated public key (hereinafter referred to as "KP," for "key pair") $KP_{T1}$, $KP_{T2}$, $KP_{Tn}$ on the one hand for the trusted authentication and on the other hand for the encryption of the information sent to it. In addition to this key pair, it uses a further private key $S_{T1}$, $S_{T2}$, $S_{Tn}$ (for instance the further cryptographic secret) which represents its identity in the network (also called "seed"; hereinafter described as "S"). Its addresses in the network are derived based on this key "S" (in which case they are technically public keys). One of these addresses is chosen as a postbox address to which messages that are intended for it can be sent. This address will be described hereinafter as "LA" (for "ledger address," address in the ledger network). Its own public key "KPPubKey" used for encrypting messages (public key of the key pair) is saved in this postbox 410, 420, 4*n*0 such that other participants can send encrypted messages to the owner of the postbox. The associated private key "KPPrivKey" remains hidden from the network. In some exemplary embodiments, both the key pair "KP" and the postbox address "LA" can be generated just once for participation in the network and not generated per process instance.

Figure 5:
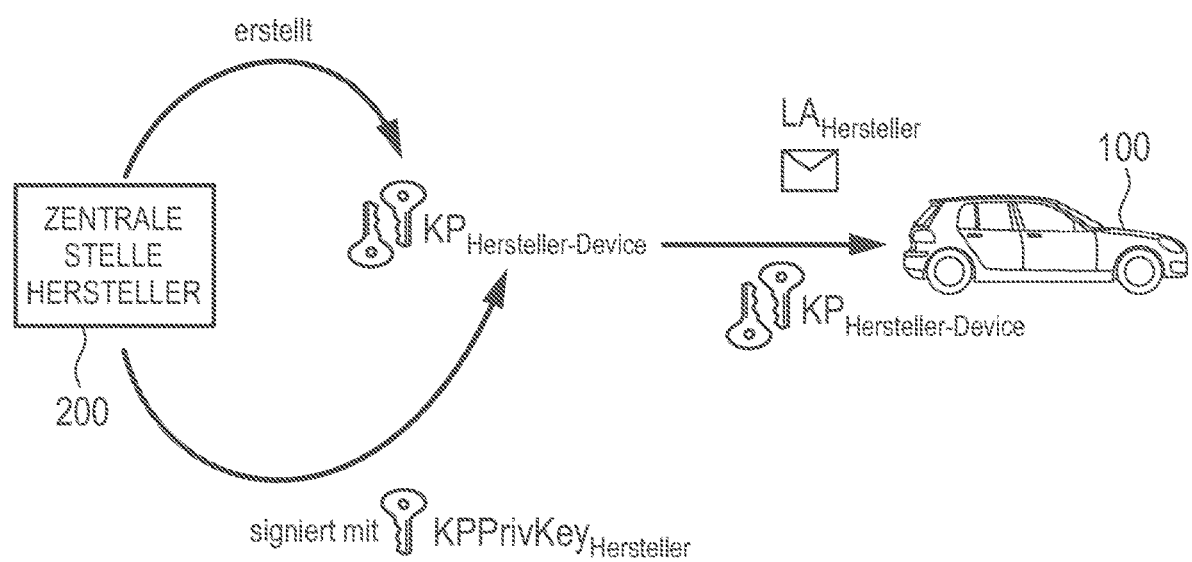
FIG. 5 shows a schematic diagram of equipping a vehicle with a cryptographic secret.

Section 1.2: FIG. 5 shows a schematic diagram of equipping a vehicle 100 with a cryptographic secret. When an IoT device (meaning, for example, a vehicle) 100 is built, the manufacturer (for instance the central point 200 of the manufacturer) equips it with a new and unique pair of a private and an associated public key (hereinafter titled "$KP_{Manufacturer-device}$" [manufacturer-device key pair], with the contained "$KPPubKey_{Manufacturer-device}$" [public key of the manufacturer-device key pair] and "$KPPrivKey_{Manufacturer-device}$" [private key of the manufacturer-device key pair]). This key pair may be, for example, the cryptographic secret from FIGS. 1*a* to 2*b*. These keys (meaning this cryptographic secret) are signed, for example, by the manufacturer's own certificate authority (for short: "CA"). In addition, the manufacturer gives the device/vehicle its own postbox address $LA_{manufacturer}$. The IoT device finds the manufacturer's public key ("$KPPubKey_{Manufacturer}$") which it uses to check the manufacturer's signature and to send encrypted messages to it, at this address.

Figure 6:
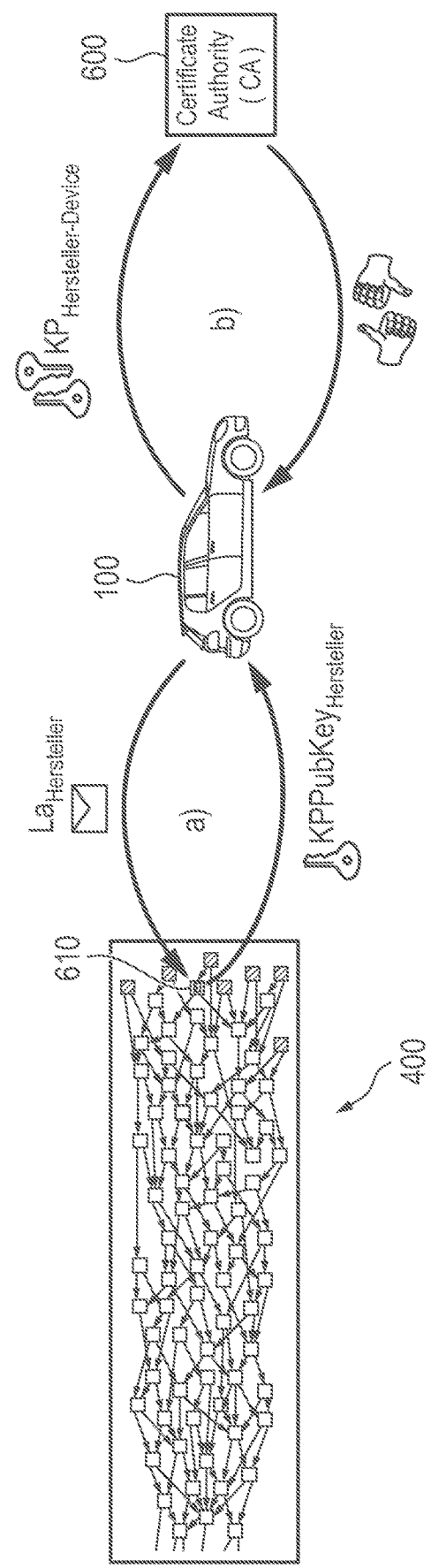
FIG. 6 shows a schematic diagram of checking a signature of the cryptographic secret.

Section 1.3: FIG. 6 shows a schematic diagram of checking a signature of the cryptographic secret. Using the signature and the knowledge about known trusted Cas 600, the device/vehicle 100 checks whether the installed keys actually originate from the manufacturer 200 (meaning whether the signature of the keys matches and is authentic). In this case, the vehicle 100 can, for instance, with the knowledge about the address of the electronic mailbox ($LA_{Manufacturer}$) 610, call up the manufacturer's public key ($KP_{PubKeyManufacturer}$) from the distributed ledger 400 and have the signature check the cryptographic secret ($KP_{Manufacturer-device}$) via the CA 600, which can confirm or deny whether the signature is authentic. This logic in turn is, for example, secure from manipulation such that an attacker cannot switch off or change these checks (for example, through embedding in what is known as a "trusted execution environment").

Section 1.4: FIG. 7 shows a schematic diagram of generating an address of an electronic mailbox 700. FIG. 8 shows a schematic diagram of the vehicle 100 generating a key pair. To participate in the distributed ledger network, the device/vehicle 100 generates:

a) its own network key (seed, see above) "$S_{Vhc1}$,"

b) a postbox address derived from this key MA ("$LA_{IoTdevice}$," IoT device stands for device of the Internet of Things, in the present case namely the vehicle), and c) a key pair ("$KP_{IoTdevice}$" with "$KPPubKey_{IoTdevice}$" and "$KPPrivKey_{IoTdevice}$") also for authenticating and encrypting messages. Since the device/vehicle generates this new key material itself and does not receive it from the manufacturer, only the vehicle has knowledge of the private key.

Figure 9:
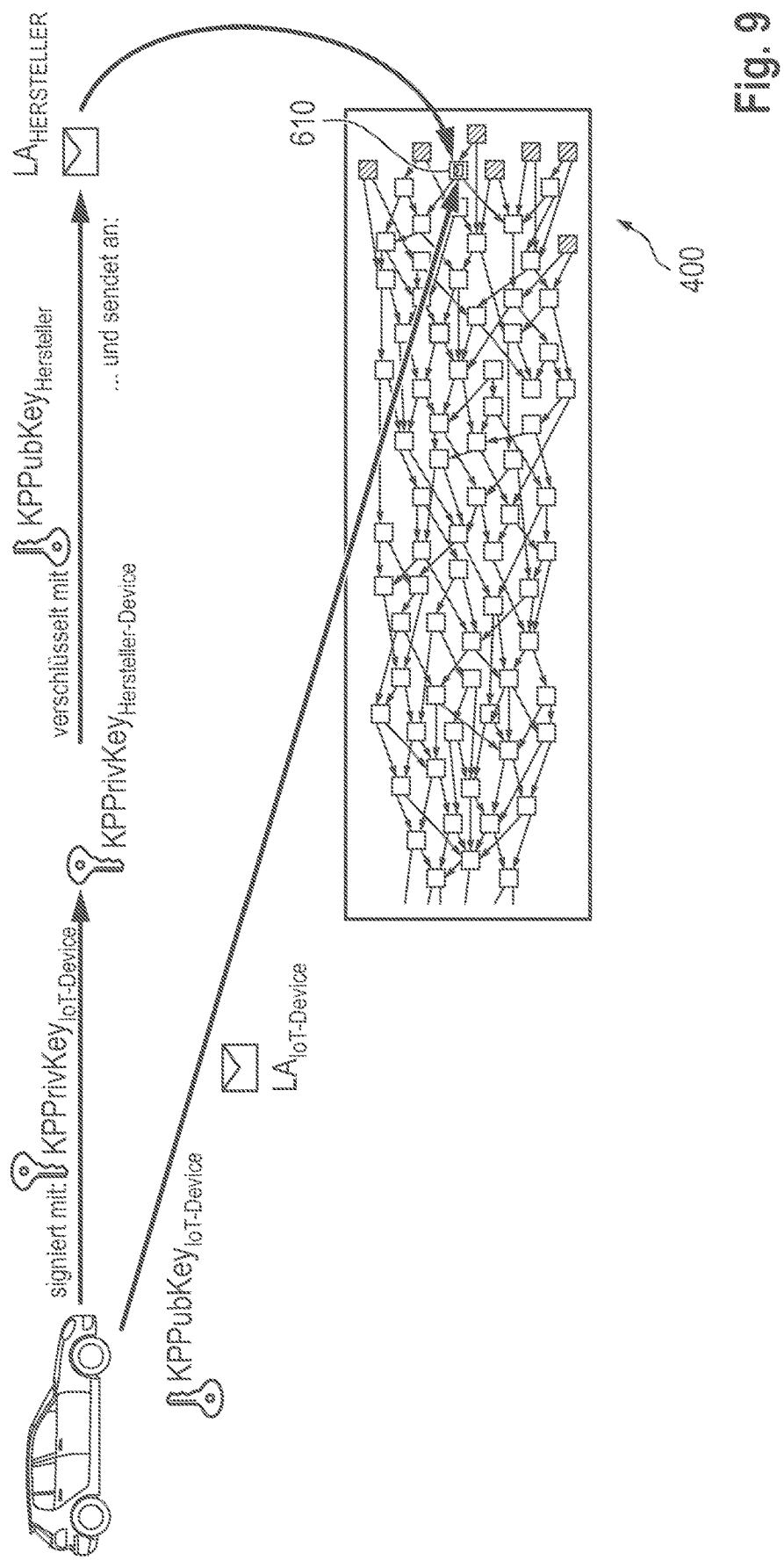
FIG. 9 shows a schematic diagram of an exchange of information between the vehicle and the central point.

Section 1.5: FIG. 9 shows a schematic diagram of an exchange of information between the vehicle and the central point. The device/vehicle 100 signs the $KPPrivKey_{Manufacturer-device}$ obtained from the manufacturer, with its newly generated $KPPrivKey_{IoTdevice}$ (the private key of the device/vehicle 100), encrypts it with the manufacturer's public key ($KPPubKey_{Manufacturer}$, the public key of the central point), and sends it—along with its own postbox address ($LA_{IoTdevice}$, the address of the electronic mailbox of the device/vehicle 100) and its own self-generated public key $KPPubKey_{IoTdevice}$ (the public key of the device/vehicle 100) to the manufacturer's postbox address 610 ($LA_{Manufacturer}$, the address of the electronic mailbox of the central location) on the distributed ledger 400.

Figure 10:
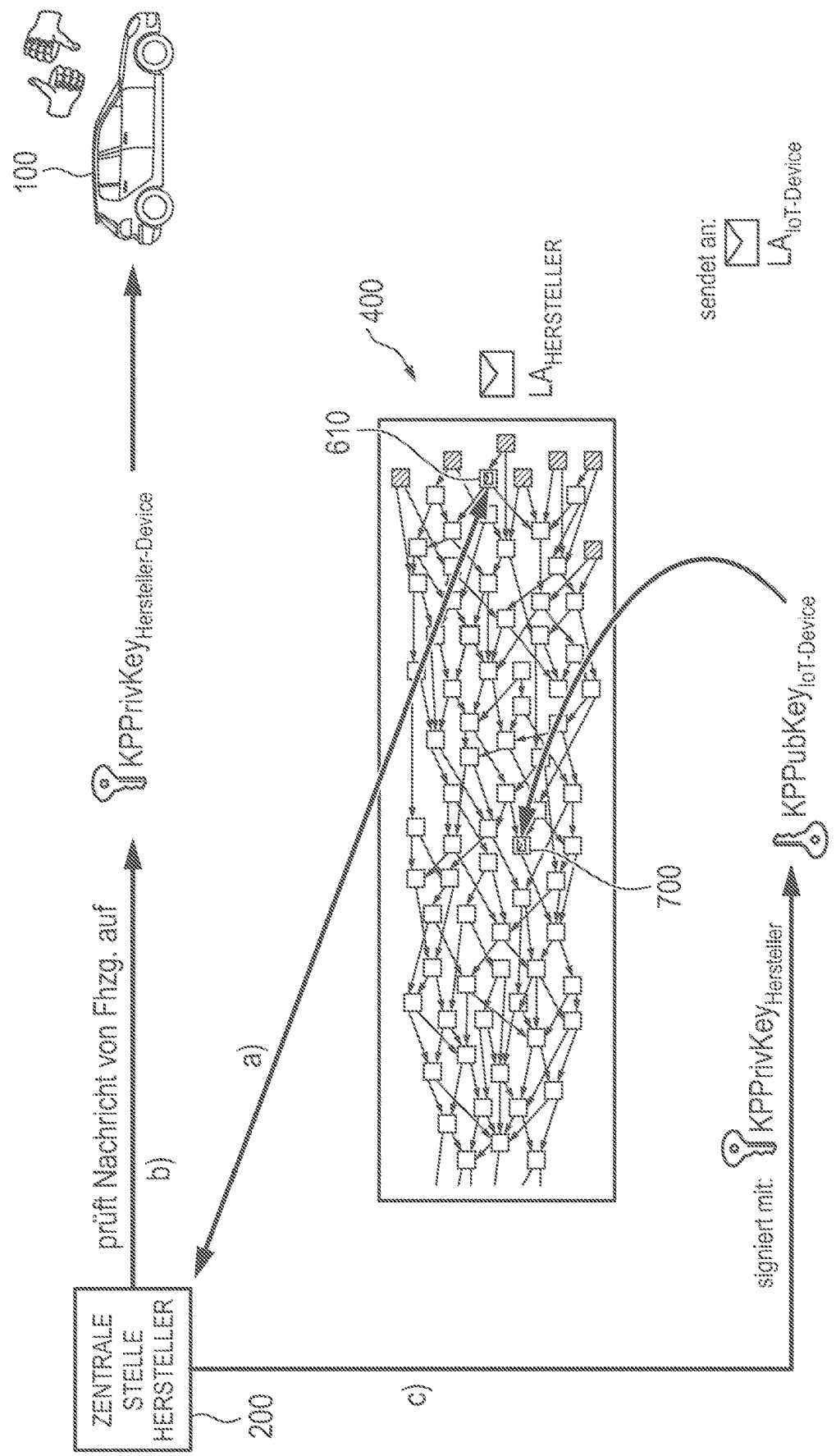
FIG. 10 shows a schematic diagram of an authentication of the information from the vehicle by the central point.

Section 1.6: FIG. 10 shows a schematic diagram of an authentication of the information of the vehicle 100 by the central point 200. The manufacturer loads the data given by the IoT device/vehicle from its postbox 610 (*a*), decrypts it with its $KPPrivKey_{Manufacturer}$ and checks (b) whether the secret $KPPrivKey_{Manufacturer-device}$ is contained in the message. Thus, it can authenticate the sender of the message since only the true sender knows this secret. As a result of this successful check, the manufacturer 200 (the central point of the manufacturer) in turn signs (c) the public key of the device/vehicle 100 ($KPPubKey_{IoTdevice}$) also given in this message and sends it to the postbox address of the device/vehicle ($LA_{IoTdevice}$) 700. Using this signature, other participants can also check the authenticity of the data supplier (meaning of the device/vehicle). At this point in time, $KP_{Manufacturer-device}$, meaning the initial key pair created by the manufacturer and given to the IoT device, can be revoked as needed since it is no longer required.

Section 1.7: As the initiator of the process, the manufacturer typically specifies the other process participants and their roles (as the process proceeds, further new participants may also be defined by other participants in the process if necessary). In all cases, the postbox address of the new participant can then be propagated to the postboxes (electronic mailboxes) of all other participants (for instance the communication partners), as a result of which the new participant can be successfully included in the process and is known to all process participants, since all other participants (and thus also the device/vehicle as primary data supplier) can only now address and provide information to it. If a participant to be added knows the addresses of the already involved participants, it can even perform such an onboarding independently.

Section 1.8: From now on, the device/vehicle can send authenticatable data securely to the consumers/the other process participants through encryption. These data are signed with $KPPrivKey_{IoTdevice}$. Consumers of these data can check this signature using the $KP_{PubKeyIoTdevice}$ (which is signed by the manufacturer with $KP_{PrivKeyManufacturer}$) and $KPPubKey_{Manufacturer}$. The device encrypts these data to be propagated with the respective public keys of the recipients ($KPPubKey_X$) and sends them to the postboxes ($LA_X$) of the participants (or stores the data to be propagated in its own postbox and notifies the participants via the participants' postboxes).

In the following, a possible implementation of the data provision by other process participants will be presented. In such a network, it may occur that data are shared not only by the primary data supplier (meaning the IoT device 100) but that the other participants also contribute data (for example supplements such as status changes, etc.). In such cases, the procedure can be as follows:

Section 2.1: The provider of the datum (hereinafter referred to as "BD"; with its own postbox $LA_{BD}$, for instance the data source 300 from FIGS. 3a and/or 3b) generates a new address on the distributed ledger (meaning a type of additional postbox, hereinafter referred to as "$LA_{AdditionalDatum}$"). This can occur either per datum to be distributed or once per process instance for multiple data (in principle, this could also occur only once per process participant; however, since there are typically different process participants per process instance, the data there are mixed). As described later, this step is optional.

Section 2.2: The BD reads out the postbox addresses (LAX) of all other process participants (for instance the plurality of devices from FIGS. 3a and/or 3b) from its own postbox $LA_{BD}$ (see sections 1.1+1.7 above) and determines the public key of the respective process participants from each postbox and thus of course also that of the IoT device (or in the example that of the vehicle).

Section 2.3: The BD generates one message per process participant (device of the plurality of devices) which contains the information to be distributed and encrypts it with the respective public key of the corresponding participant. These messages are all sent, for example, to the address $LA_{AdditionalDatum}$.

Section 2.4: The BD sends a notification about the new information saved in $LA_{AdditionalDatum}$ (including address) to the postboxes of all process participants (for instance the electronic mailboxes of the plurality of devices)

Section 2.5: The IoT device can also additionally publish this information if necessary in its own message channel (for documentation, or to reach other recipients that may not be known to BD). This approach also enables other process participants to contribute data. The detour via the address $LA_{AdditionalDatum}$ (see sections 2.1 and 2.4) is provided (only) for documentation purposes. Instead of saving the messages about a new datum in a channel in $LA_{AdditionalDatum}$ and informing the process participants about the message through their postboxes, it is of course also alternatively possible to propagate the new information directly to the postboxes of the process participants.

Note: It is described in section 1.7 how the process initiator specifies the process participants. This gives this process participant certain control possibilities as a "man-in-the-middle." To reduce this risk, the communication partners regularly participating in such process networks can exchange their public keys and postbox addresses directly.

Some exemplary embodiments also establish a control of the visibility at the "data set" and "attribute" level. The security in distributed ledger networks comes from a large number of decentrally stored copies of the same data, such that an attacker would have to compromise a majority of the network, or of the copies, in order to manipulate the data. Public DLT networks tend to have a large number of copies. However, even though transparency is a basic idea of such networks, one would not like to, or cannot and may not be allowed to, distribute their data unencrypted.

The procedure described in the present disclosure allows the visibility of data to be controlled both at the data set level (meaning for an individual data entry with typically multiple attributes that belong together) and at the attribute level. If an IoT device sends, for example, a specific status message, it may be that not everyone is allowed to see the entire status message due to technical or security requirements, but rather that it can only be decrypted for individual participants in the process network (control of the visibility at the data set level), or that the notice itself is visible for all participants in the network but individual attributes of such a notice (for example the GPS position [position according to a global positioning system] or similar) is only allowed to be seen by selected participants (control of the visibility at the attribute level). Mixed forms are also possible. Since the data are encrypted with the respective public key of each participant, only the respective participant can decrypt it (with its private key). The data generator/distributor can thus control which attributes should be viewable for which participant/role on the basis of roles, visibility groups, or individual authorizations using the appropriate public key, since the data packets are each distributed individually encrypted.

If there are large overlaps here, e.g., if different process participants have the same visibility authorizations for the same data sets or attributes, it makes sense to provide such authorizations with a common key pair in order to reduce the data redundancy on the exchange medium (meaning, for example, the distributed ledger).

This occurs, for example, as follows:

Section 3.1: The provider of the datum (still referred to hereinafter as "BD") generates a symmetric key (SGX) and a group postbox (LA-GX) for each role/rights group and sends the key and the address of LA-GX to this group participant encrypted with the public key of the respective participant.

Section 3.2: The BD encrypts data and/or attributes on the basis of roles/rights groups. It encrypts the data that are viewable for multiple participants with the group key SGX. The rest continues to be encrypted for each participant with the public key of the respective participant.

Section 3.3: The BD sends the data encrypted with the group key to the group postbox LA-GX and the data encrypted with the public keys of the participants to the postboxes of the participants.

Section 3.4: Each participant checks not only its personal postbox, but also that of the group for new messages. It decrypts the messages in the group postbox with the obtained group key, messages to its personal postbox with its private key as before. It then, if necessary, merges the data obtained through the different channels.

Some exemplary embodiments of the present disclosure also establish a reduction of the vulnerability through random distribution. DLT networks are characterized, among other things, in that numerous decentralized entry points into the network (known as "nodes") exist. Each node (at least those known as "full nodes") stores the entire transaction history of the network and thereby secures it from manipulation. If a participant would now like to use such a network for data storage, it selects a node and gives it the data to the stored.

A node cannot change the data if it has not generated them itself (since they are typically signed with the private key of the sender and a manipulation would therefore quickly be noticed); however, it could discard individual transactions that have been given to it before entering them in the ledger.

In addition, if the same node were chosen as the entry point into the DLT network for all transactions that an IoT device emits, external attackers could possibly identify these nodes and incapacitate them with an attack and thus prevent the distribution of data of the affected IoT device. To minimize the risk of manipulation through such attacks, the emitted transactions in some exemplary embodiments are saved by the IoT device at randomly selected nodes (e.g., at a random selection of one or more nodes of the plurality of nodes) for inclusion in the ledger so that the communication between the device and the network is not predictable.

At least some exemplary embodiments can be used outside of distributed ledger networks. As already described above, the use of exemplary embodiments of the present disclosure is not necessarily coupled to distributed ledger networks. Even in an environment in which the data exchange takes place via a centralized architecture, the authenticity of messages and their senders can be ensured with the described procedure for a secured key exchange. In this case, the security may be reduced since the central component, as a "man in the middle," has more far-reaching intervention opportunities than in a decentralized network structure. In comparison with "trust authorities," exemplary embodiments, in particular exemplary embodiments based on decentralized databases, offer considerably increased immunity to external and malicious influences. Exemplary embodiments can be used, for example, in V2X communication (communication between vehicles and other communication partners, wherein the X stands for different types of communication partners). Exemplary embodiments can furthermore relate to cases in which data, for example, in process networks are exchanged with partners/(sub-) suppliers (in the supply chain).

Another exemplary embodiment is a computer program for executing at least one of the above-described methods, if the computer program runs on a computer, a processor, or a programmable hardware component. Another exemplary embodiment is also a digital storage medium that is machine or computer-readable, and that has electronically-readable control signals which can interact with a programmable hardware component so that one of the above-described methods is executed.

The features disclosed in the above description, the following claims and the accompanying figures can be relevant and implemented in their different embodiments both individually as well as in any combination to realize an exemplary embodiment.

Although many aspects were described in conjunction with an apparatus, it is understood that these aspects also represent a description of the corresponding method so that a block or a component of an apparatus is also to be understood as a corresponding method step or as a feature of a method step. Analogously, aspects that were described in conjunction with or as a method step also represent a description of a corresponding block or details or a feature of a corresponding apparatus.

Depending on specific implementation requirements, exemplary embodiments may be implemented in hardware or in software. The implementation may be performed using a digital storage medium such as a floppy disk, DVD, Blu-ray disc, CD, ROM, PROM, EPROM, EEPROM or flash memory, hard disk, or another magnetic or optical memory on which electronically-readable control signals are saved that interact or can interact with a programmable hardware component so that the respective method is performed.

A programmable hardware component may be formed by a processor, a computer processor (CPU=central processing device), a graphics processor (GPU=graphics processing device), a computer, a computer system, an application-specific integrated circuit (ASIC), an integrated circuit (IC), a single chip system (SOC=system-on-a-chip), a programmable logic element or a field-programmable gate array with a microprocessor (FPGA=field-programmable gate array).

The digital storage medium may therefore be machine or computer-readable. Several exemplary embodiments therefore comprise a data carrier that has electronically-readable control signals which are capable of interacting with a programmable computer system or a programmable hardware component such that a method described herein is performed. An exemplary embodiment is accordingly a data carrier (or a digital storage medium or a computer-readable medium) on which the program for performing one of the methods described herein is recorded.

In general, exemplary embodiments may be implemented as a program, firmware, computer program or computer program product with a program code or as data, wherein the program code or the data is, or respectively are effective in performing one of the methods when the program runs on a processor or a programmable hardware component. The program code or the data can for example also be saved on a machine-readable carrier or data carrier. The program code or the data can inter alia exist as source code, machine code or byte code as well as another intermediate code.

Another exemplary embodiment is furthermore a stream of data, a signal sequence, or a sequence of signals that represents, or respectively represent the program for performing one of the methods described herein. The stream of data, the signal sequence or the sequence of signals may for example be configured in order to be transferred via a data communication link, such as via the Internet or another network. Exemplary embodiments are accordingly also signal sequences representing data that are suitable for being transmitted via a network or a data communication link, wherein the data represent the program.

A program according to one exemplary embodiment can implement one of the methods while it is being performed for example in that it reads out memory areas or writes a datum or several data to them, whereby possibly switching processes or other processes are evoked in transistor structures, in amplifier structures or in other components which are electrical, optical or magnetic or which function according to another functional principle. Correspondingly, by reading out a memory area, data, values, sensor values, or other information can be recorded, determined or measured by a program. A program can therefore record, determine or measure quantities, values, measurands and other information by reading out one or more memory areas, and can cause, induce or perform an action by writing to one or more memory areas, or control other devices, machines and components.

The above-described exemplary embodiments merely represent an illustration of the principles of the present disclosure. Of course, modifications and variations of the arrangements and details described herein are apparent to other persons skilled in the art. It is therefore intended that the invention is only restricted by the scope of protection of the following claims, and not by the specific details which were presented herein with reference to the description and the explanation of the exemplary embodiments.

LIST OF REFERENCE NUMERALS

10 Apparatus for a device
12 Interface
14 One or more processors
20 Apparatus for a central point
22 Interface
24 One or more processors
30 Apparatus for a data source
32 Interface
34 One or more processors
41, 42, 4n Participant in a process network
100 Device
110 Obtaining a cryptographic secret
120 Obtaining a public key of a central point
125 Checking a signature of the cryptographic secret
130 Generating a cryptographic key pair
135 Generating an address of an electronic mailbox of the device
140 Signing the cryptographic secret
150 Encrypting the signed cryptographic secret
160 Providing the encrypted, signed cryptographic secret, the address of the electronic mailbox of the device, and a public key of the device
170 Obtaining a signed version of the public key of the device
175 Providing the signed version of the public key of the device
180 Providing the address of the electronic mailbox of the device
190 Obtaining one or more messages
195 Decrypting the one or more messages
200 Central point
205 Signing a cryptographic secret
210 Providing the cryptographic secret for a device
220 Providing a public key of the central point for the device
230 Obtaining a signed and encrypted version of the cryptographic secret, an address of an electronic mailbox of the device, and a public key of the device from the device
240 Checking the signed and encrypted version of the cryptographic secret
250 Encrypted communication with the device
260 Signing the public key of the device
300 Data source
310 Obtaining addresses of electronic mailboxes of devices
320 Obtaining cryptographic keys of the devices
330 Generating one or more messages for the devices
335 Signing the one or more messages
340 Providing the one or more messages via an electronic mailbox
350 Providing notifications
400 Distributed ledger
410, 420, 4n0 Postboxes of a participant on the distributed ledger
600 Trusted certificate authority
610 Manufacturer's electronic mailbox
700 Vehicle's electronic mailbox The invention has been described in the preceding using various exemplary embodiments. Other variations to the disclosed embodiments can be understood and effected by those skilled in the art in practicing the claimed invention, from a study of the drawings, the disclosure, and the appended claims. In the claims, the word "comprising" does not exclude other elements or steps, and the indefinite article "a" or "an" does not exclude a plurality. A single processor, module or other device may fulfil the functions of several items recited in the claims.

The term "exemplary" used throughout the specification means "serving as an example, instance, or exemplification" and does not mean "preferred" or "having advantages" over other embodiments.

The mere fact that certain measures are recited in mutually different dependent claims or embodiments does not indicate that a combination of these measures cannot be used to advantage. Any reference signs in the claims should not be construed as limiting the scope.

What is claimed is:

1. A computer-implemented method for exchanging cryptographic key information between a device and a central point, the method comprising:
    obtaining, by the device, a cryptographic secret, wherein the cryptographic secret is known to the central point and is issued by the central point, wherein the device has a device IP address and a device electronic mailbox has a device electronic mailbox IP address, wherein the central point has a central point IP address and a central point electronic mailbox has a central point electronic mailbox IP address;
    obtaining, by the device, a public key of the central point;
    generating, by the device, a cryptographic key pair for the device with a private key of the device and a public key of the device;
    signing, by the device, the cryptographic secret with the private key of the device;
    encrypting, by the device, the cryptographic secret signed with the private key of the device with the public key of the central point;
    providing, by the device, the encrypted and signed cryptographic secret, the device electronic mailbox IP address, and the public key of the device to the central point via the central point electronic mailbox,
    wherein the central point electronic mailbox and the device electronic mailbox are accessible via a distributed database, and
    wherein the distributed database is based on a plurality of nodes, wherein providing and/or obtaining data via an electronic mailbox through the distributed database is based on a random selection of one or more nodes of the plurality of nodes for providing and/or obtaining the information.

2. The method of claim 1, wherein obtaining the public key of the central point comprises obtaining the central point electronic mailbox IP address and calling up the public key of the central point from the central point electronic mailbox.

3. The method of claim 1, wherein the distributed database is based on a distributed ledger technology, wherein the central point electronic mailbox IP address and the device electronic mailbox IP address are IP addresses on the distributed ledger.

4. The method of claim 1, wherein the cryptographic secret is signed by a private key of the central point, wherein the method furthermore comprises checking the signature of the cryptographic secret based on the public key of the central point.

5. The method of claim 4, wherein checking the signature and/or generating the cryptographic key pair is performed at least partially in a trusted execution environment of the device.

6. The method of claim 1, comprising generating the device electronic mailbox IP address based on another cryptographic secret.

7. The method of claim 1, comprising obtaining a version of the public key of the device signed by the central point from the central point.

8. The method of claim 7, comprising providing the signed version of the public key of the device via the device electronic mailbox.

9. A non-transitory medium with a program code for performing the method of claim 1 when the program code is executed on a computer, a processor, a controller or a programmable hardware component.

10. A computer-implemented apparatus for exchanging cryptographic key information between a device and a central point, wherein the apparatus is suitable for exchanging the cryptographic key information from the device side, the apparatus comprising:
an interface for communicating with the central point; and
one or more processors designed to execute the method according to claim 1.

11. The method of claim 2, wherein the cryptographic secret is signed by a private key of the central point, wherein the method furthermore comprises checking the signature of the cryptographic secret based on the public key of the central point.

12. The method of claim 1, wherein the cryptographic secret is signed by a private key of the central point, wherein the method furthermore comprises checking the signature of the cryptographic secret based on the public key of the central point.

13. A computer-implemented method for exchanging cryptographic key information between a device and a central point, wherein the method is executed by the central point, the method comprising:
providing a cryptographic secret for the device, wherein the device has a device IP address and a device electronic mailbox has a device electronic mailbox IP address;
providing a public key of the central point for the device, wherein the central point has a central point IP address and a central point electronic mailbox has a central point electronic mailbox IP address, wherein the public key of the central point is provided from the central point electronic mailbox IP address;
providing a version of the cryptographic secret encrypted with the public key of the central point and signed with a private key of the device, a device electronic mailbox IP address, and a public key of the device from the device to the central point electronic mailbox IP address;
checking the obtained version of the cryptographic secret based on a private key of the central point and based on the cryptographic secret;
encrypted communicating with the device via the device electronic mailbox based on the public key of the device
wherein the central point electronic mailbox and the device electronic mailbox are accessible via a distributed database, and
wherein the distributed database is based on a plurality of nodes, wherein providing and/or obtaining data via an electronic mailbox through the distributed database is based on a random selection of one or more nodes of the plurality of nodes for providing and/or obtaining the information.

14. The method of claim 13, comprising signing the public key of the device with the private key of the central point, and providing the signed public key for the device.

15. A non-transitory medium with a program code for performing the method of claim 13 when the program code is executed on a computer, a processor, a controller or a programmable hardware component.

16. A computer-implemented apparatus for exchanging cryptographic key information between a device and a central point, wherein the apparatus is suitable for exchanging the cryptographic key information from the central point side, the apparatus comprising:
an interface for communicating with the device; and
one or more processors designed to execute the method of claim 13.

17. A computer-implemented method for exchanging cryptographic key information between a vehicle and a central point, the method comprising:
obtaining, by the vehicle, a cryptographic secret, wherein the cryptographic secret is known to the central point and is issued by the central point,
generating, by the vehicle, a vehicle IP address;
generating, by the vehicle, a vehicle electronic mailbox IP address for a vehicle electronic mailbox by generating its own network key and deriving the vehicle electronic mailbox IP address from its own network key,
wherein the central point has a central point IP address and a central point electronic mailbox has a central point electronic mailbox IP address;
obtaining, by the vehicle, a central point public key;
generating, by the vehicle, a cryptographic key pair for the vehicle having a private vehicle key and a public vehicle key;
signing, by the vehicle, the cryptographic secret with the private vehicle key;
encrypting, by the vehicle, the cryptographic secret signed with the private vehicle key and with the central point public key;
providing, by the vehicle, the encrypted and signed cryptographic secret, the vehicle electronic mailbox IP address, and the vehicle public key to the central point via the central point electronic mailbox,
wherein the central point electronic mailbox and the vehicle electronic mailbox are accessible via a distributed database, and
wherein the distributed database is based on a plurality of nodes, wherein providing and/or obtaining data via an electronic mailbox through the distributed database is based on a random selection of one or more nodes of the plurality of nodes for providing and/or obtaining the information.

18. The method of claim 17, wherein obtaining the central point public key comprises obtaining the central point electronic mailbox IP address and calling up the public key of the central point from the central point electronic mailbox.

19. The method of claim 17, wherein the distributed database is based on a distributed ledger technology, wherein the central point electronic mailbox IP address and the vehicle electronic mailbox IP address are IP addresses on the distributed ledger.

20. The method of claim 17, wherein the cryptographic secret is signed by a central point private key, wherein the method furthermore comprises checking the signature of the cryptographic secret based on the central point public key.

* * * * *